(12) United States Patent
Farrand et al.

(10) Patent No.: US 10,106,686 B2
(45) Date of Patent: Oct. 23, 2018

(54) PARTICLES FOR ELECTROPHORETIC DISPLAYS

(71) Applicants: Merck Patent GmbH, Darmstadt (DE); The Queen's University of Belfast, Belfast (GB)

(72) Inventors: Louise D. Farrand, Dorset (GB); Claire Topping, Southampton (GB); Sarah Norman, Chilton (GB)

(73) Assignees: Merck Patent GmbH (DE); The Queen's University of Belfast (GB)

( * ) Notice: Subject to any disclaimer, the term of this patent is extended or adjusted under 35 U.S.C. 154(b) by 0 days.

(21) Appl. No.: 14/896,842

(22) PCT Filed: May 15, 2014

(86) PCT No.: PCT/EP2014/001319
§ 371 (c)(1),
(2) Date: Dec. 8, 2015

(87) PCT Pub. No.: WO2014/198373
PCT Pub. Date: Dec. 18, 2014

(65) Prior Publication Data
US 2016/0177103 A1 Jun. 23, 2016

(30) Foreign Application Priority Data
Jun. 12, 2013 (EP) .................... 13003004

(51) Int. Cl.
| | | |
|---|---|---|
| *C09C 3/10* | (2006.01) | |
| *C09C 1/56* | (2006.01) | |
| *C08F 220/68* | (2006.01) | |
| *G02F 1/167* | (2006.01) | |
| *C08L 33/12* | (2006.01) | |
| *C09B 31/043* | (2006.01) | |
| *C09B 47/24* | (2006.01) | |
| *C09C 1/36* | (2006.01) | |
| *C09B 29/08* | (2006.01) | |
| *C09B 29/42* | (2006.01) | |
| *C09B 47/06* | (2006.01) | |
| *C09B 47/067* | (2006.01) | |
| *C09B 67/08* | (2006.01) | |
| *C09B 69/10* | (2006.01) | |

(52) U.S. Cl.
CPC ............ *C09C 3/10* (2013.01); *C09B 29/0813* (2013.01); *C09B 29/363* (2013.01); *C09B 31/043* (2013.01); *C09B 47/065* (2013.01); *C09B 47/0678* (2013.01); *C09B 47/24* (2013.01); *C09B 67/0013* (2013.01); *C09B 69/106* (2013.01); *C09B 69/108* (2013.01); *C09C 1/3676* (2013.01); *C09C 1/56* (2013.01); *C01P 2004/62* (2013.01); *C01P 2006/62* (2013.01); *C01P 2006/63* (2013.01); *C01P 2006/64* (2013.01)

(58) Field of Classification Search
CPC ........... C09C 3/10; C09C 1/56; C09C 1/3676; C09B 29/0813; C09B 29/363; C09B 31/043; C09B 47/065; C09B 47/0678; C09B 47/24; C09B 67/0013; C09B 69/106; C09B 69/108; C08F 220/68; G02F 1/167; C08L 33/12; C01P 2004/62; C01P 2006/62; C01P 2006/63; C01P 2006/64
USPC ................... 204/450, 536; 252/519.34, 583; 359/296; 427/58, 213.3, 213.34, 487; 428/32.25, 402, 407; 430/32, 38; 524/849
See application file for complete search history.

(56) References Cited

U.S. PATENT DOCUMENTS

| | | | |
|---|---|---|---|
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2007/0128352 A1 | 6/2007 | Honeyman et al. | |
| 2007/0268244 A1 | 11/2007 | Chopra et al. | |
| 2010/0002287 A1* | 1/2010 | Naijo ..................... G02F 1/167 359/296 |
| 2012/0329355 A1 | 12/2012 | Liang et al. | |

FOREIGN PATENT DOCUMENTS

| | | |
|---|---|---|
| GB | 2438436 A | 11/2007 |
| WO | WO-99/10767 A1 | 3/1999 |
| WO | WO-2005017046 A2 | 2/2005 |
| WO | WO-2009100803 A2 | 8/2009 |
| WO | WO-2010050949 A1 | 5/2010 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2010104606 A1 | 9/2010 |
| WO | WO-2011017446 A1 | 2/2011 |
| WO | WO-2011075720 A1 | 6/2011 |
| WO | WO-2011154103 A1 | 12/2011 |
| WO | WO-2012019704 A1 | 2/2012 |
| WO | WO-2012072218 A1 | 6/2012 |
| WO | WO 2012072218 A1 * | 6/2012 ............ G02F 1/167 |
| WO | WO-2013079146 A1 | 6/2013 |
| WO | WO-2013170934 A1 | 11/2013 |

OTHER PUBLICATIONS

U.S. Appl. No. 14/896,835, filed Dec. 8, 2015, Farrand et al.
(Continued)

*Primary Examiner* — Bijan Ahvazi
(74) *Attorney, Agent, or Firm* — Drinker Biddle & Reath LLP

(57) ABSTRACT

This invention relates to particles comprising a pigment core particle encapsulated by a polymer, a process for their preparation, electrophoretic fluids comprising such particles, and electrophoretic display devices comprising such fluids.

23 Claims, No Drawings

(56) References Cited

OTHER PUBLICATIONS

Shaplov, A., et al., "Polymeric Ionic Liquids: Comparison of Polycations and Polyanions", *Macromolecules*, vol. 44, No. 24, (2011), pp. 9792-9803.
Earle, M., et al., "Ionic liquids. Green solvents for the future", Pure and Applied Chemistry, vol. 72, No. 7, (2000), pp. 1391-1398.
Hagiwara, R., et al., "Room temperature ionic liquids of alkylimidazolium cations and fluoroanions", Journal of Fluorine Chemistry, vol. 105, (2000), pp. 221-227.
International Search Report for PCT/EP2014/001319 dated Aug. 29, 2014.
Sheldon, R., "Catalytic reactions in ionic liquids", Chemical Communications, (2001), pp. 2399-2407.
Wasserscheid, P., et al., "Ionische Flüssigkeiten—neue „Lösungen fü r die Übergangsmetallkatalyse", Angewandte Chemie, vol. 112, (2000), pp. 3926-3945.
Welton, T., "Room-Temperature Ionic Liquids. Solvents for Synthesis and Catalysis", Chemical Reviews, vol. 99, No. 8, (1999), pp. 2071-2083.

\* cited by examiner

PARTICLES FOR ELECTROPHORETIC DISPLAYS

CROSS-REFERENCE TO RELATED APPLICATIONS

This application is a national stage application (under 35 U.S.C. § 371) of PCT/EP2014/001319, filed May 15, 2014, which claims benfit of European Application No. 13003004.2, filed Jun. 12, 2013, both of which are incorporated herein by reference in their entirety.

This invention relates to particles comprising a pigment core particle encapsulated by a polymer, a process for their preparation, electrophoretic fluids comprising such particles, and electrophoretic display devices comprising such fluids, and the use of the particles in optical, electrooptical, electronic, electrochemical, electrophotographic, electrowetting and electrophoretic displays and/or devices, in security, cosmetic, decorative or diagnostic applications.

EPDs (Electrophoretic Displays) and their use for electronic paper are known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used. Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244).

An important characteristic of particles intended for use in an electrophoretic fluid is that the particles carry a charge. Only the charge will allow the particles to be moved under an electric filed and hence enable the display pixel to be switched between two optical states. The traditional approach of creating charged species in low dielectric constant media is by the addition of surfactants that form micelles of sufficient size. It is believed that the charges on the particle are created by abstraction or addition of an ion or proton from the particle. The created charge is then contained in the core of the micelles and stabilised against recombination with the oppositely charged counterpart. The use of this charging method is well established.

The situation is further complicated in the development of real-life formulations for EPD applications. In many cases, at least two different particle species are present in the formulation and often more than one surfactant is used. A typical formulation will therefore consist of a complicated and dynamic set of interactions between the different particle surfaces, surfactants, and dispersion medium. Additionally, the equilibria may change under the influence of the electric field.

An alternative route of inducing charge to particles in an EPD fluid is described in WO 2010/050949 where a charge is fixed to a polymeric shell. However, this method requires good access to the particle surface, which may be blocked by a steric stabilisation layer, and availability of reactive groups, which may not be present. WO 2012/072218 describes particles having a charge fixed by a polymerisable cation. However, there continues to be a need for improved electrophoretic fluids and particles which can be easily prepared and dispersed in non-polar media.

The present invention relates to particles comprising an organic or inorganic pigment core particle encapsulated by a polymer having monomer units of a) at least one ethylenically unsaturated monomer, b) at least one polymerisable ionic liquid of Formula (I) or at least one polymerisable ionic liquid of Formula (II)

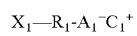  Formula (I)

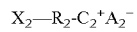  Formula (II)

wherein $X_1$ and $X_2$ is a polymerisable group, $R_1$ and $R_2$ is a spacer group, $A_1^-$ and $A_2^-$ is an anion, and $C_1^+$ and $C_2^+$ is a cation, c) optionally at least one polymerisable dye, d) and optionally at least one polymerisable steric stabiliser.

Furthermore, the invention relates to a process for the preparation of these particles, the use of the particles in electrophoretic fluids, and electrophoretic display devices comprising these fluids. The subject matter of this invention specifically relates to white reflective particles and black particles, and to electrophoretic fluids and displays comprising such white reflective particles and/or black particles. Particles according to the invention preferably comprise at least one surfactant, preferably soluble in non-polar organic solvents.

The present invention provides an EPD particle having a charge permanently fixed by covalently bound, soft, bulky ions. The present invention provides an EPD particle having a charge permanently fixed by covalently bound ions. These polymer particles are prepared by copolymerising a polymerisable ionic liquid having a polymerisable ion during particle synthesis.

Advantages of the invention are: controlling of sign of the particle charge, no unbound charging agent in the dispersion medium, and/or no charge polydispersity. The use of an ionic liquid with a polymerisable group enables the charge to become irreversibly chemically bound and well entangled in the polymer particle, thus avoiding the presence of charging material in the dispersion medium. This reduces undesired effects like shielding of the electric field and fluid transport phenomenon like electro-hydrodynamic instability.

The invention can provide high performance EPD particles which exhibit zeta potentials of more than 50 mV or even more than 100 mV. This potential directly influences the velocity of the particle movement under the influence of the electric field and thus the display switching speed and performance.

The term polymerisable ionic liquid (PIL) throughout this invention means an ionic liquid $A^-C^+$ with a polymerisable group attached to the anion or the cation via a spacer group. The term ionic liquid refers to organic salts that usually have melting points below 373 K. Review articles on ionic liquids are, for example, R. Sheldon "Catalytic reactions in ionic liquids", *Chem. Commun.*, 2001, 2399-2407; M. J. Earle, K. R. Seddon "Ionic liquids. Green solvent for the future", *Pure Appl. Chem.*, 72 (2000), 1391-1398; P. Wasser-scheid, W. Keim "Ionische Flüssigkeiten—neue Lösungen für die Übergangsmetallkatalyse" [Ionic Liquids—Novel Solutions for Transition-Metal Catalysis], *Angew. Chem.*, 112 (2000), 3926-3945; T. Welton "Room temperature ionic liquids. Solvents for synthesis and catalysis", *Chem. Rev.*, 92 (1999), 2071-2083 or R. Hagiwara, Ya. Ito "Room temperature ionic liquids of alkylimidazolium cations and fluoroanions", *J. Fluorine Chem.*, 105 (2000), 221-227.

Ionic liquid molecules provide soft, bulky ions that have the ability to dissociate in low dielectric constant liquids. In the present invention an ionic liquid is used where the anion or the cation is modified with a polymerisable group to incorporate soft, bulky ions in polymer particles. The polymerisable ionic liquid is copolymerised with an ethylenically unsaturated monomer during particle synthesis. The polymerisable ionic liquids of Formula (I) and Formula (II), respectively contain a polymerisable group ($X_1$ or $X_2$), a spacer group ($R_1$ or $R_2$), an anion ($A_1^-$ or $A_2^-$), and a cation ($C_1^+$ or $C_2^+$).

The polymerisable group $X_1$ and $X_2$ can be any polymerisable group like methacrylates, acrylates, methacrylamides, acrylonitriles, α-substituted acrylates, styrenes, vinyl, and substituted vinyl. Especially preferred are methacrylates and acrylates, especially methacrylates.

The spacer group $R_1$ and $R_2$ can be an alkylene chain, polyether, poly-dialkylsiloxane. Spacer group R may be for example a group $-(A-B)_m-$ with A=linear or branched alkylene, preferably with 1 to 12 carbon atoms, especially with 1 to 4 carbon atoms, B=O or S, preferably O, and m=0 to 5, preferably 1 to 3. In particular, the spacer group R is a group $-(CH_2CHR-O)_m-$ with m=0 to 5, preferably 1 to 3, and R=H or $C_{1-4}$-alkyl, especially H or $CH_3$.

The anion $A_1^-$ and $A_2^-$ can be, for example, a borate, imide, phosphate, sulfonate, sulfate, succinate, naphthenate or carboxylate.

The cation $C_1^+$ and $C_2^+$ can be an organic cation, such as, for example, a phosphonium, sulfonium, oxonium, ammonium, uronium, thiouronium, guanidinium or heterocyclic cations such as imidazolium, pyridinium, pyrrolidinium, triazolium, morpholinium or piperidinium cation.

Polymerisable ionic liquids according to Formula (I) $X-R-A_1^-C_1^+$ preferably comprise the following preferred anions and cations.

Especially, the following anions $A_1^-$ are used (abbreviations in brackets): 3-Sulfopropylmethacrylate (SPMA) and 3-Sulfopropylacrylate (SPA)

Preferred cation $C_1^+$ are selected from the group of ammonium, phosphonium, and sulfonium cations, preference is given to the compounds of the formulae (1), (2) and (3):

$$[NR_4]^+ \quad (1),$$

$$[PR_4]^+ \quad (2),$$

$$[SR_3]^+ \quad (3),$$

where
R in each case, independently of one another, denotes
a straight-chain or branched alkyl having 1-20 C atoms, which optionally can be partially fluorinated, but not in α-position to hetero-atom, and which can also include oxygen or/and sulfur atoms in any positions in between carbon atoms;
saturated, partially or fully unsaturated cycloalkyl having 5-7 C atoms, which may be substituted by alkyl groups having 1-6 C atoms.

Especially, cations are preferred where R in each case stands for a straight-chain or branched alkyl having 4-20 C atoms, preferably 4-10 C atoms.

From the group of heterocyclic cations, preference is given to the compounds selected from the group:

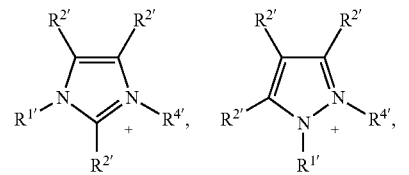

imidazolium     1H-pyrazolium

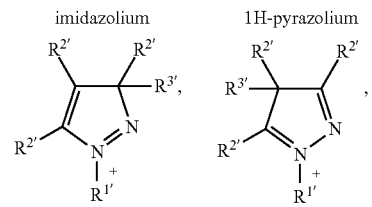

3H-pyrazolium     4H-pyrazolium

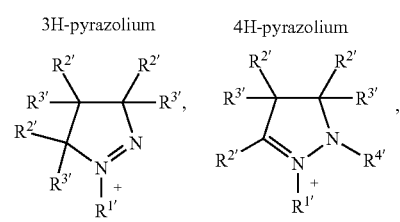

1-pyrazolinium     2-pyrazolinium

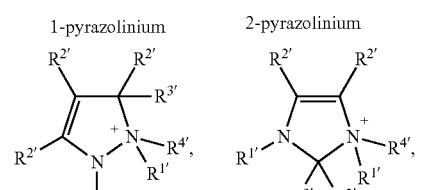

3-pyrazolinium     2,3-dihydroimidazolinium

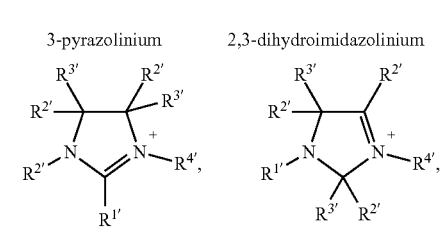

4,5-dihydroimidazolinium     2,5-dihydroimidazolinium

pyrrolidinium     1,2,4-triazolium

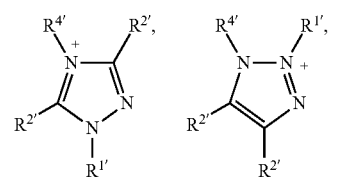

1,2,4-triazolium     1,2,3-triazolium

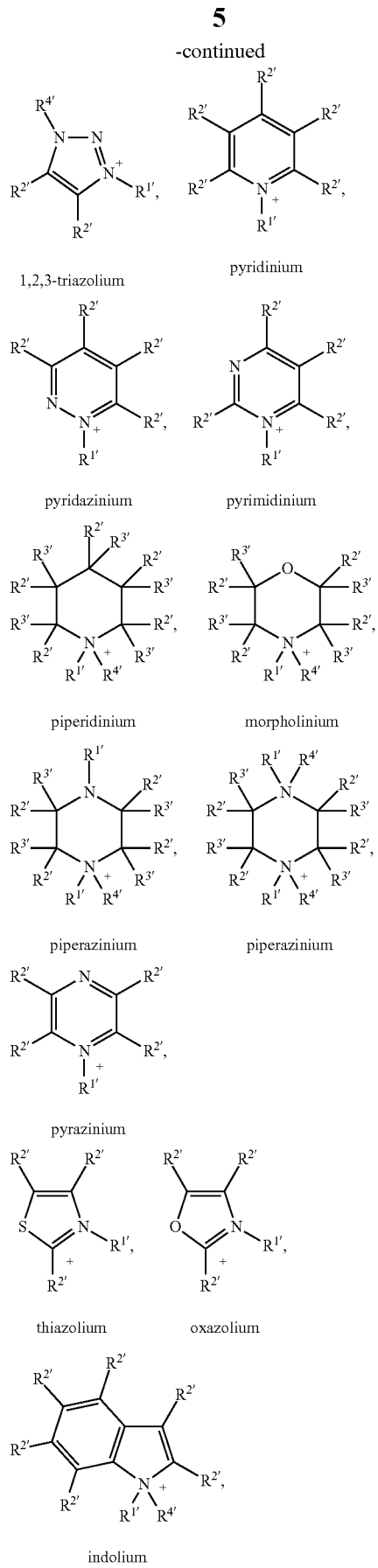

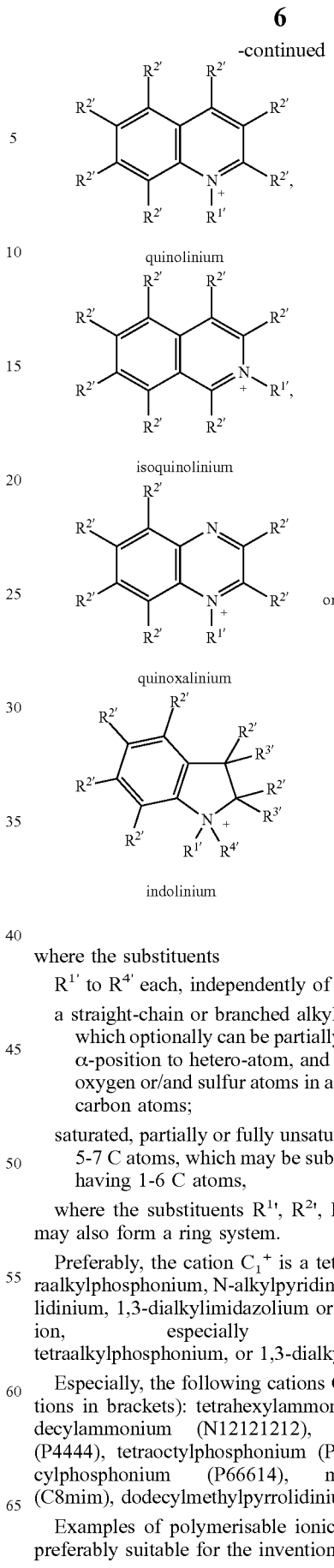

where the substituents

R¹' to R⁴' each, independently of one another, denote a straight-chain or branched alkyl having 1-20 C atoms, which optionally can be partially fluorinated, but not in, α-position to hetero-atom, and which can also include oxygen or/and sulfur atoms in any positions in between carbon atoms;

saturated, partially or fully unsaturated cycloalkyl having 5-7 C atoms, which may be substituted by alkyl groups having 1-6 C atoms, where the substituents R¹', R²', R³' and/or R⁴' together may also form a ring system.

Preferably, the cation $C_1^+$ is a tetraalkylammonium, tetraalkylphosphonium, N-alkylpyridinium, N,N-dialkylpyrrolidinium, 1,3-dialkylimidazolium or trialkyl-sulfonium cation, especially tetraalkylammonium, tetraalkylphosphonium, or 1,3-dialkylimidazolium cation.

Especially, the following cations $C_1^+$ are used (abbreviations in brackets): tetrahexylammonium (N6666), tetradodecylammonium (N12121212), tetrabutylphosphonium (P4444), tetraoctylphosphonium (P8888), trihexyltetradecylphosphonium (P66614), methyloctylimidazolium (C8mim), dodecylmethylpyrrolidinium (C12mpyrr).

Examples of polymerisable ionic liquids $X—R-A_1^-C_1^+$ preferably suitable for the invention are listed in Table 1.

TABLE 1

| PIL | Cation | Anion |
|---|---|---|
| N6666 SPMA | (C6H13)4N+ | methacryloyloxy-propyl-sulfonate |
| N8888 SPMA | (C8H17)4N+ | methacryloyloxy-propyl-sulfonate |
| N4444 SPMA | (C4H9)4N+ | methacryloyloxy-propyl-sulfonate |
| N10101010 SPMA | (C10H21)4N+ | methacryloyloxy-propyl-sulfonate |
| N11111111 SPMA | (C11H23)4N+ | methacryloyloxy-propyl-sulfonate |
| N12121212 SPMA | (C12H25)4N+ | methacryloyloxy-propyl-sulfonate |
| N11116 SPMA | (CH3)3(C16H33)N+ | methacryloyloxy-propyl-sulfonate |
| P4444 SPMA | (C4H9)4P+ | methacryloyloxy-propyl-sulfonate |
| P6666 SPMA | (C6H13)4P+ | methacryloyloxy-propyl-sulfonate |
| P8888 SPMA | (C8H17)4P+ | methacryloyloxy-propyl-sulfonate |
| P66614 SPMA | (C6H13)3(C14H29)P+ | methacryloyloxy-propyl-sulfonate |
| C8mim SPMA | 1-methyl-3-octylimidazolium | methacryloyloxy-propyl-sulfonate |
| C6mim SPMA | 1-hexyl-3-methylimidazolium | methacryloyloxy-propyl-sulfonate |
| C12mpyrr SPMA | 1-dodecyl-1-methylpyrrolidinium | methacryloyloxy-propyl-sulfonate |
| N6666 SPA | (C6H13)4N+ | acryloyloxy-propyl-sulfonate |
| N8888 SPA | (C8H17)4N+ | acryloyloxy-propyl-sulfonate |
| N12121212 SPA | (C12H25)4N+ | acryloyloxy-propyl-sulfonate |
| P8888 SPA | (C8H17)4P+ | acryloyloxy-propyl-sulfonate |
| C12mpyrr SPA | 1-dodecyl-1-methylpyrrolidinium | acryloyloxy-propyl-sulfonate |

Polymerisable ionic liquids according to Formula (II) X—R—$C_2^+A_2^-$ preferably used for the preparation of particles of the present invention and their preparation are described in WO 2012/072218. Thus, the disclosure of WO 2012/072218 is expressly part of the disclosure content of the present patent application.

$C_2^+$ is preferably an alkyl substituted ammonium, pyridinium, pyrrolidinium or imidazolium group.

Especially, the following polymerisable cations X—R—$C_2^+$ are used:
N-[2-(methacryloyloxy)ethyl]-N,N,N-trialkylammonium
N-[2-(methacryloyloxy)ethyl]-N,N,N-trimethylammonium (MOTMA)
N-[2-(methacryloyloxy)propyl]-N,N,N-trimethylammonium
N-[2-(methacryloyloxy)ethyl]-N,N,N-trihexylammonium (MOTHA)
N-[2-(methacryloyloxy)propyl]-N,N,N-trihexylammonium
N-[(2-methacryloxy)-(AO)$_x$-A]-N,N,N-trialkylammonium
1-[2-(methacryloyloxy)ethyl]-3-butylimidazolium
1-(2-methacryloxyethyl)-3-methyl imidazolium
1-[(2-methacryloxy)-(AO)$_x$-A]-3-methylimidazolium
1-[2-(methacryloyloxy)ethyl]-1-butylpyrrolidinium
1-(2-methacryloxyethyl)-1-methylpyrrolidinium
1-[(2-methacryloxy)-(AO)$_x$-A]-1-methylpyrrolidinium
wherein (AO)$_x$ is a polyalkyl oxide preferably with x=1-10, especially with x=2-4 and A especially=ethylene, propylene,
1-[(2-methacryloxy)-C$_y$]-3-methylimidazolium,
1-[(2-methacryloxy)-C$_y$]-1-methylpyrrolidinium,
wherein C$_y$ is an alkyl chain preferably with y=1 to 12, especially with y=1 to 4,
N-(acryloxy-ethyl)-N,N,N-trimethylammonium (AOTMA),
N-(acryloxy-ethyl)-N,N,N-trihexylammonium (AOTHA),
N-(acryloxy-propyl)-N,N,N-trihexylammonium
N-[3-(methacryloylamino)propyl]-N,N,N-trimethylammonium
N-[3-(methacryloylamino)propyl]-N,N,N-trihexylammonium N,N,N,N-tetraallylammonium
1-allyl-3-methylimidazolium
1-allyl-1-methylpyrrolidinium
N-butyl-4-vinyl-pyridinium
N-ethyl-4-vinyl-pyridinium
N-methyl-4-vinyl-pyridinium
N-methyl-2-vinyl-pyridinium
N,N-diallyl-N,N-dimethylammonium
N-(vinylbenzyl)-N,N,N-trimethylammonium Particularly, N-[2-(methacryloyloxy)ethyl]-N,N, N-trimethylammonium (MOTMA) and N-[2-(methacryloyloxy)ethyl]-N,N,N-trihexylammonium (MOTHA) are preferred polymerisable cations.

$A_2^-$ is preferably:
tetracyanoborate (TCB), tetraphenylborate (TPB), tetrakis(3,5-bis(trifluoromethyl)phenyl)borate (TFPB), bis(trifluoromethylsulfonyl)imide (NTF), tris(pentafluoroethyl) trifluorophosphate (FAP), bis[bis(pentafluoroethyl)phosphinyl]imide (FPI), nonafluorobutane sulfonate (nonaflate) (NFS), (bis(2-2-ethyl hexyl) sulfosuccinate (AOT), pentafluoroethyl-dicyano-fluoro borate, methoxy-tricyano borate, ethoxy-tricyano borate and 2,2,2-trifluordethoxy-tricyano borate;

a fluoroalkyl phosphate anion (FAP-anion), e.g. $[PF_3(C_2F_5)_3]^-$, $[PF_3(C_4F_9)_3]^-$, $[PF_3(C_3F_7)_3]^-$, $[PF_4(C_2F_5)_2]^-$, $[PF_5(C_2F_5)]^-$;

a fluoroalkyl-fluoro borate anion (FAB anion), e.g. $[B(CF_3)_4]^-$, $[B(C_2F_5)_4]^-$, $[BF_3(CF_3)]^-$, $[BF_3(C_2F_5)]^-$, $[BF_3(i-C_3F_7)]^-$, $[BF_2(CF_3)_2]^-$, $[BF_2(C_2F_5)_2]^-$, $[BF_2(CF_3)_2]^-$, $[BF(C_2F_5)_3]^-$, $[BF(CF_3)_3]^-$ oder $[BF(CF_3)(C_2F_5)_2]^-$.

Particularly, tetraphenylborate (TPB), tetrakis(3,5-bis(trifluoromethyl)phenyl)borate (TFPB), and (bis(2-2-ethyl hexyl) sulfosuccinate (AOT) are preferred anions.

Examples of polymerisable ionic liquids $X-R-C_2^+A_2^-$ preferably suitable for the invention are listed in Table 2.

TABLE 2

| PIL | Cation | Anion |
|---|---|---|
| | (structure) | (structure) |
| MOTMA NFBS | (structure) | (structure) |
| MOTMA NTf | (structure) | (structure) |
| MOTMA AOT | (structure) | (structure) |
| MOTMA FAP | (structure) | (structure) |

TABLE 2-continued

| PIL | Cation | Anion |
|---|---|---|
| MOTHA TFPB | methacrylate ethyl trihexylammonium cation | tetrakis[3,5-bis(trifluoromethyl)phenyl]borate |
| MOTHA | methacrylate ethyl trihexylammonium cation | nonafluorobutanesulfonate |
| MOTHA NTf | methacrylate ethyl trihexylammonium cation | bis(trifluoromethanesulfonyl)imide |
| MOTHA FAP | methacrylate ethyl trihexylammonium cation | tris(pentafluoroethyl)trifluorophosphate |
| MOTHA AOT | methacrylate ethyl trihexylammonium cation | bis(2-ethylhexyl) sulfosuccinate |
| MOTHA TCB | methacrylate ethyl trihexylammonium cation | tetracyanoborate |
| MOTMA I | methacrylate ethyl trimethylammonium cation | I$^-$ |
| MOTMA BF4 | methacrylate ethyl trimethylammonium cation | BF$_4^-$ |

TABLE 2-continued

| PIL | Cation | Anion |
|---|---|---|
| MOTMA PF6 | (methacrylate-OCH2CH2-N+(CH3)3) | PF6− |
| MOTMA BuSO3 | (methacrylate-OCH2CH2-N+(CH3)3) | O−−S(=O)2−CH2CH2CH2CH3 |
| EtHxVIm BuSO3 | (vinyl imidazolium with 2-ethylhexyl) | O−−S(=O)2−CH2CH2CH2CH3 |
| C12Vim BuSO3 | (vinyl imidazolium with C12 alkyl) | O−−S(=O)2−CH2CH2CH2CH3 |
| EtHxVIm NTf | (vinyl imidazolium with 2-ethylhexyl) | (F3C-SO2)2N− |
| C12Vim NTf | (vinyl imidazolium with C12 alkyl) | (F3C-SO2)2N− |

The polymerisable ionic liquids of the invention and/or their precursors are commercially available and/or can be synthesised by methods known to the person skilled in the art, for example, by ion exchange which can be carried out under conditions known to the person skilled in the art. The bromide salts used for the preparation of imidazolium and pyrrolidinium based ionic liquids are typically prepared according to Scheme 1. Anion exchange used for the preparation of all SPMA ionic liquids is shown in Scheme 2.

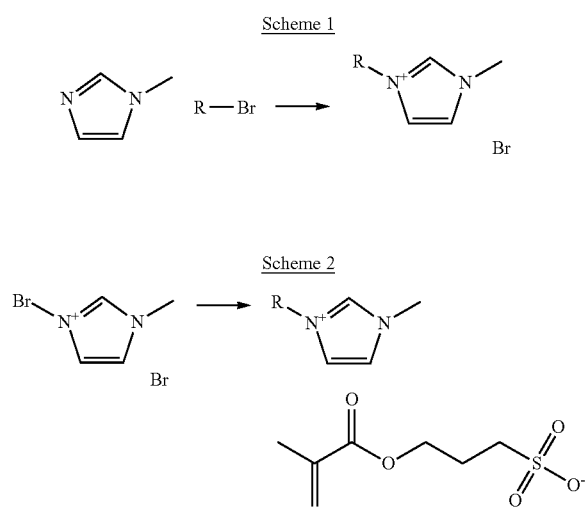

Scheme 1

Scheme 2

The preparation of further compounds according to the invention can be carried out analogously to the illustrative reactions shown above. The preparation of further compounds according to the invention can also be carried out by other methods known per se to the person skilled in the art from the literature. All process steps described above and below can be carried out using known techniques and standard equipments which are described in prior art and are well-known to the skilled person.

Usually, the polymer particles according to the invention comprise at least one polymerisable ionic liquid of Formula (I) or (II), at least one monomer, a pigment core particle, optionally at least one polymerisable dye, optionally at least one surfactant, and optionally at least one polymerisable, steric stabiliser.

Preferably, the particles according to the invention comprise a polymerisable ionic liquid of Formula (I) or (II), at least one monomer, a pigment core particle, at least one polymerisable steric stabiliser, at least one surfactant, and optionally at least one polymerisable dye.

The core particles can be selected to achieve different optical effects. Properties can vary from being highly scattering to being transparent. The pigments can be coloured including black or white.

Primarily, the invention provides white reflective particles by incorporating an inorganic material of sufficiently high refractive index and white reflectivity into an organic polymer based particle to yield a hybrid polymeric particle which exhibits good white reflective properties. Preferably, white reflective particles are used having a refractive index of $\geq 1.8$, especially $\geq 2.0$, are used. Especially titanium dioxide (titania), zinc oxide, silicon dioxide, alumina, barium sulphate, zirconium dioxide, zinc sulfite, calcium carbonate, cerussite, kaolinite, diantimony trioxide and/or tin dioxide, especially titanium dioxide, can be used.

Preferably, titanium dioxide based pigments are used which could have the rutile, anatase, or amorphous modification, preferably rutile or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765. Preferably, Du Pont R960, and Sachtleben RDI-S are used.

Examples of pigments suitable to achieve colour or black or fluorescent are: Carbon black, manganese ferrite, copper chromite, chromium (III) oxide green, mixed oxides, cobalt blue spinel, ultramarine pigments, iron blue, iron (III) oxide red, iron (III) oxide orange, iron oxide hydroxide (FeOOH) yellow, iron oxide ($Fe_3O_4$) black, iron (II, III) oxide black. Organic pigments with structures based on carbazoles, perinones, vat pigments, benzimidazolones, isoindolinones, Cu-phthalocyanine, quinacridone, monoazo, disazo, azo pigment lakes, perylene, naphthalimide, quaterrylene or diketopyrrolopyrrole, thiazine indigo, polycyclic quinones are also suitable for the present invention. Preferably, carbon black, manganese ferrite, and copper chromite are used. In particular the invention relates to black particles based on carbon black.

The invention allows density control by tunability of the shell around the inorganic pigment. The amount of the organic material in the reaction can be increased relative to the inorganic pigment which results in a lower density particle, or if higher density is desired, the pigment ratio can be increased.

Pigments encapsulated within the particles are preferably well dispersed in a non-aggregated state in order to achieve the optimum optical properties. If the pigment is high density, the optimum loading of the pigment within polymer may not only be affected by the optical properties but also the density of the resulting particle in order to achieve improved bistability. Pigments are present in the particle (on weight of total particle) from 5-95%, preferably 10-60% and even more preferably 10-50%.

The particles can be prepared from most monomer types, in particular methacrylates, acrylates, acrylamides, methacrylamides, acrylonitriles, α-substituted acrylates, styrenes and vinyl ethers, vinyl esters, and propenyl ethers. The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxypropyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy)ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene,N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylpyridine, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylpyridine, N-Vinyl-2-pyrrolidinone, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Preferred monomers are methyl methacrylate and methacrylic acid, especially methyl methacrylate.

Particles of the invention preferably comprise polymerisable steric stabilisers which can be covalently bonded onto the pigment core particles. Advantageously, the present invention does not require custom synthesised stabilisers with difficult to control steric lengths and multistep complex syntheses with expensive or difficult to synthesise components. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:

Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxpropyl terminated branched polydimethylsiloxanes (683), (methacryloxypropyl)methylsiloxanes-Dimethylsiloxane copolymers (viscosity 8000, 1000, 2000), (acryloxypropyl)methylsiloxane-dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes-symmetric (mw 800), monomethacryloxypropyl terminated polytrifluoropropylmethylsiloxanes-symmetric (mw 800) monovinyl terminated polydimethylsiloxanes (mw 5500, 55000, monovinyl functional polydimethylsiloxanes-symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

Formula 1

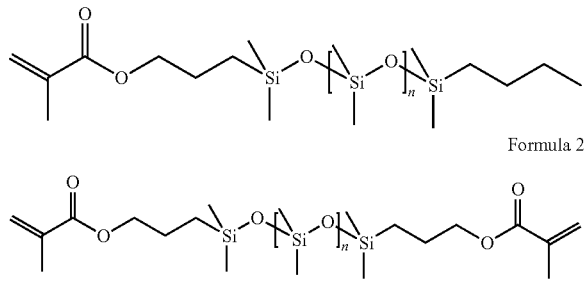

Formula 2

The polymerisable steric stabiliser of the invention preferably has a molecular weight in the range of 1000-50000, preferably 3500-35000, more preferably 5000-25000. Most preferred are methacrylate terminated polydimethylsiloxanes with a molecular weight of 10,000 or more, especially 10000-25000.

Particles of the invention preferably comprise a surfactant. The present invention has a further advantage that the pigment core particle, i.e. titania (titanium dioxide) is located near the centre of particles and is well dispersed. In particles not comprising a surfactant essential for the present invention, titania was found to be aggregated largely and this will naturally result in lower reflectivity. According to the invention, surfactants are used to keep titania particles separate while still allowing them to be encapsulated by the polymer. This also results in titania being located in the centre of particles which will give better optics and more consistent electrophoretic behavior. Especially, titania is embedded through careful addition of a (stabilising) surfactant to the titania particles before polymerisation. By control of level of surfactant, the titania is dispersed well in the polymer particles.

The role of the surfactant is to disperse the organic or inorganic pigment particles. Typical surfactants are soluble in aliphatic solvents used for polymerisation and have an oil soluble tail to provide stability with a hydrophilic head to provide adsorption to the pigment particle surface. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants. Preferably, polyisobutylene succinimides may be used.

Examples of preferred surfactants are the Span, Brij and Tween range (Sigma-Aldrich), the Solsperse, Ircosperse and Colorburst range (Lubrizol), the OLOA range (Chevron Chemicals) and Aerosol-OT (A-OT) (Aldrich). A-OT (dioctyl sulfosuccinate sodium salt), Span 80 and Span 85 (partially unsaturated sorbitan trioleate), Solsperse 17000, and OLOA 11000 are particularly useful to disperse and coat titania in this reaction. Single surfactants as well as blends of surfactants may be used.

Each pigment and surfactant system has a slightly different optimum, though in general a level of 1-8% surfactant on weight of pigment is usually around the optimum level. The level varies due to differences in effectiveness and efficiency of surfactants and surface modification and surface area of pigment.

A further co-monomer may be a polymerisable dye comprising at least one polymerisable group, preferably at least two polymerisable groups. In general the polymerisable dyes may be solvent soluble or water soluble and they may be anionic, cationic, zwitterionic or neutral.

The polymerisable dye preferably comprises a chromophoric group and two polymerisable groups selected from e.g. methacrylates, acrylates, methacrylamides, acrylamides, acrylonitriles, α-substituted acrylates, styrenes and vinyl ethers, vinyl esters, propenyl ethers, oxetanes and epoxys etc., in particular methacrylates and acrylates.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

The polymerisable groups may be attached directly to the chromophoric group or may be attached through a linker group L.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferably dyes with more than one polymerisable group are used. In principle any polymerisable dye can be used, preferable with more than one polymerisable group (most preferably with 2 polymerisable groups) and preferably with a methacrylate or acrylate function. Advantageously, the polymerisable dyes disclosed in WO2010/089057, WO2012/019704, and WO 2013/079146 are used. Preferably dyes of Formulas (I')-(VI') are used:

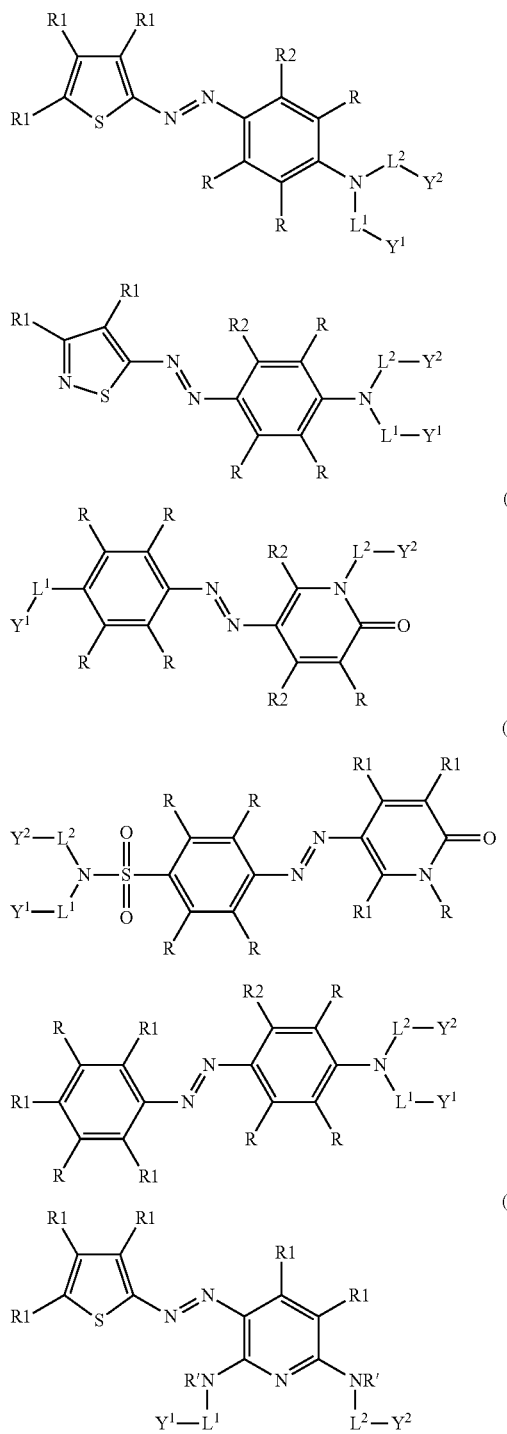

(I')
(II')
(III')
(IV')
(V')
(VI')

wherein R is H; R1 and R2 are independently of one another alkyl, preferably C1-C6 alkyl, —OR', —SR', —C(O)R', —C(O)OR', —NHCOR', —NO₂, —CN, with R' equal to H or alkyl, preferably C1-C6 alkyl, especially C1-C3 alkyl; $L^1$ and $L^2$ are independently of one another a single bond, C1-C6 alkyl, a polyether alkyl chain, or a combination thereof, preferably C2-C4 alkyl, especially C2 and C4 alkyl, especially identical groups $L^1$ and $L^2$ are preferred; and $Y^1$ and $Y^2$ are methyl acrylate or methyl methacrylate, especially identical groups $Y^1$ and $Y^2$ are preferred.

Especially preferred are polymerisable dyes of Formulas (I')-(VI') wherein R is H; R1 and R2 are independently of one another —CH₃, —NO₂, —OH, —CN, —COCH₃, —CO₂CH₂CH₃, —NHCOR'; $L^1$ and $L^2$ are, preferably identical, C2-C4 alkyl, and $Y^1$ and $Y^2$ are, preferably identical, methyl acrylate or methyl methacrylate, wherein R2 is preferably —CH₃, —OH or —NHCOR'.

Also polymerisable dyes of Formula (VII) are preferably used,

Formula (VII)

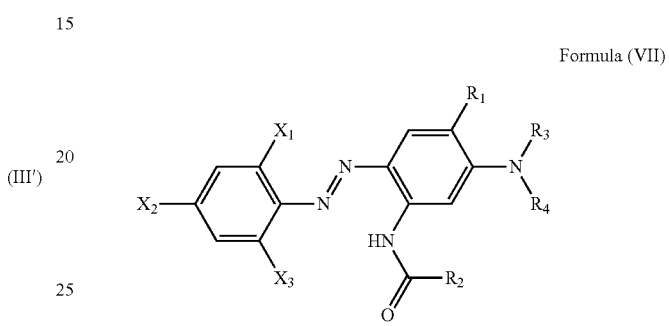

Wherein
$X_1$, $X_2$, and $X_3$ are independently of one another H or an electron-withdrawing group;
$R_1$ is H or OR' with R'=a linear, branched or cyclic alkyl group;
$R_2$ is a linear, branched or cyclic alkyl group;
$R_3$ and $R_4$ are independently of one another groups of the structure $L_3$-$Y_3$, $L_4$-$Y_4$;
$L_3$, and $L_4$ are linker groups and independently of one another linear or branched, substituted or unsubstituted alkylene groups where one or more non-adjacent carbon atoms may be replaced by O, S and/or N, preferably O;
$Y_3$, and $Y_4$ are independently of one another polymerisable groups;
Wherein at least one of $R_3$ and $R_4$ comprises a polymerisable group and at least one of $X_1$, $X_2$, and $X_3$ is an electron-withdrawing group.

Also polymerisable dyes of Formula (VIII) are preferably used.

Formula (VIII)

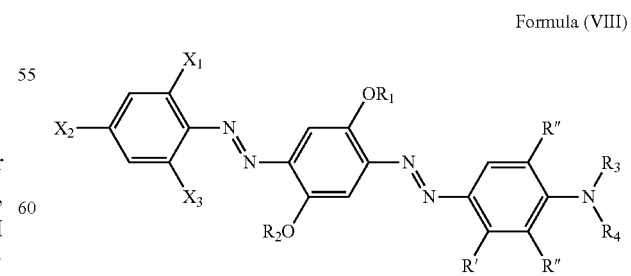

Wherein
$X_1$, $X_2$, and $X_3$ are independently of one another H or an electron-withdrawing group;

$R_1$ and $R_2$ are independently of one another groups of the structure $L_1$-$Y_1$, $L_2$-$Y_2$ or linear, branched or cyclic alkyl groups;

$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N, preferably O;

$L_1$, $L_2$, $L_3$, and $L_4$ are linker groups and independently of one another linear or branched, substituted or unsubstituted alkylene groups where one or more non-adjacent carbon atoms may be replaced by O, S and/or N, preferably O;

$Y_1$, $Y_2$, $Y_3$, and $Y_4$ are independently of one another polymerisable groups; R' is a linear or branched alkyl group, $OR_5$, H, $NHCOR_6$ or $NHSO_2R_7$; R" is $OR_5$, H or $NHCOR_6$, $R_5$, $R_6$, and $R_7$ are independently of one another linear or branched alkyl groups; and Wherein at least one of $R_1$, $R_2$, $R_3$ and $R_4$ is a polymerisable group and at least one of $X_1$, $X_2$, and $X_3$ is an electron-withdrawing group.

The following definitions concern Formulae (VII) and (VIII):

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include $NO_2$, CN, halogen, acyl, trifluoromethoxy, trifluoromethyl, $SO_2F$, and $CO_2R$, $SO_2R$, $SO_2NRR$ or $SO_2NHR$, with R being independently linear or branched alkyl, preferably C1-C4 alkyl. Preferably, at least one of $X_1$, $X_2$, and $X_3$ is $NO_2$, CN, Br, Cl, $SO_2NRR$ or $SO_2NHR$. Especially preferred are polymerisable dyes with $X_2$ and one of $X_1$ and $X_3$ being $NO_2$, CN, Br, Cl, $SO_2NRR$ or $SO_2NHR$, preferably with R=methyl. Also preferred are polymerisable dyes with $X_2$ being $NO_2$, CN, Br, Cl, $SO_2NRR$ or $SO_2NHR$, preferably with R=methyl, and $X_1$ and $X_3$ being H.

The polymerisable groups $Y_3$, and $Y_4$ may be selected from e.g. methacrylate, acrylate, methacrylamide, acrylamide, oxetanes, vinyl, vinyloxy, epoxy, allyl, propenyl ether, styryl groups, in particular methacrylate, acrylate, methacrylamide, and acrylamide. Preferably, groups $Y_3$, and $Y_4$ are selected from methacrylate and acrylate.

$R_1$ and $R_2$ are preferably C1-C20 alkyl groups, especially alkyl groups having 1 to 10 carbon atoms. C2-C8 alkyl groups are even more preferred.

$R_3$ and $R_4$ are independently of one another groups of the structure $L_3$-$Y_3$ or $L_4$-$Y_4$, preferably $L_3$ and $L_4$ are independently of one another linear or branched C1-C20 alkylene groups, especially alkylene groups having 1 to 10 carbon atoms. Linear C2-C6 alkylene groups are even more preferred. Especially groups where $Y_3$ and $Y_4$ are methacrylate or acrylate are preferred. Especially identical groups $Y_3$ and $Y_4$ are preferred.

Preferred polymerisable dyes are in particular those dyes in which all variables have the preferred meanings. The following are examples of dyes which can preferably be used:

TABLE 3

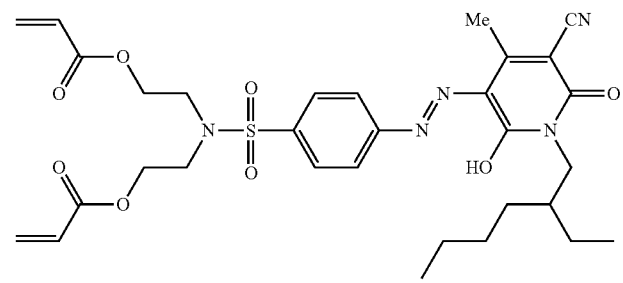 [SMILES: C=CC(=O)OCCN(CCOC(=O)C=C)S(=O)(=O)c1ccc(/N=N/c2c(C)c(C#N)c(=O)n(CC(CC)CCCC)c2O)cc1]

Dye 1

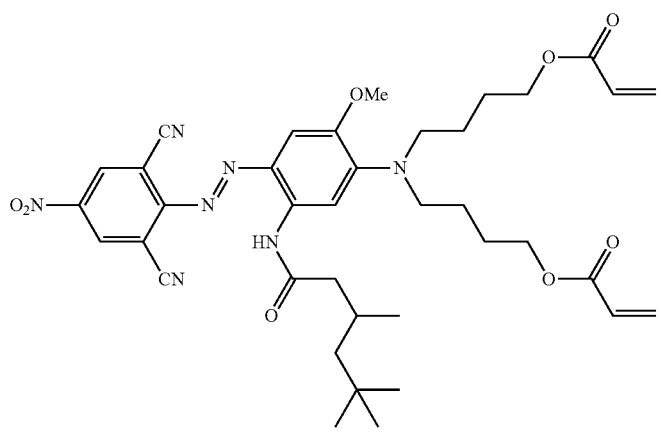 [SMILES: C=CC(=O)OCCCCN(CCCCOC(=O)C=C)c1cc(NC(=O)CC(C)CC(C)(C)C)c(/N=N/c2c(C#N)cc([N+](=O)[O-])cc2C#N)cc1OC]

Dye 2

TABLE 3-continued
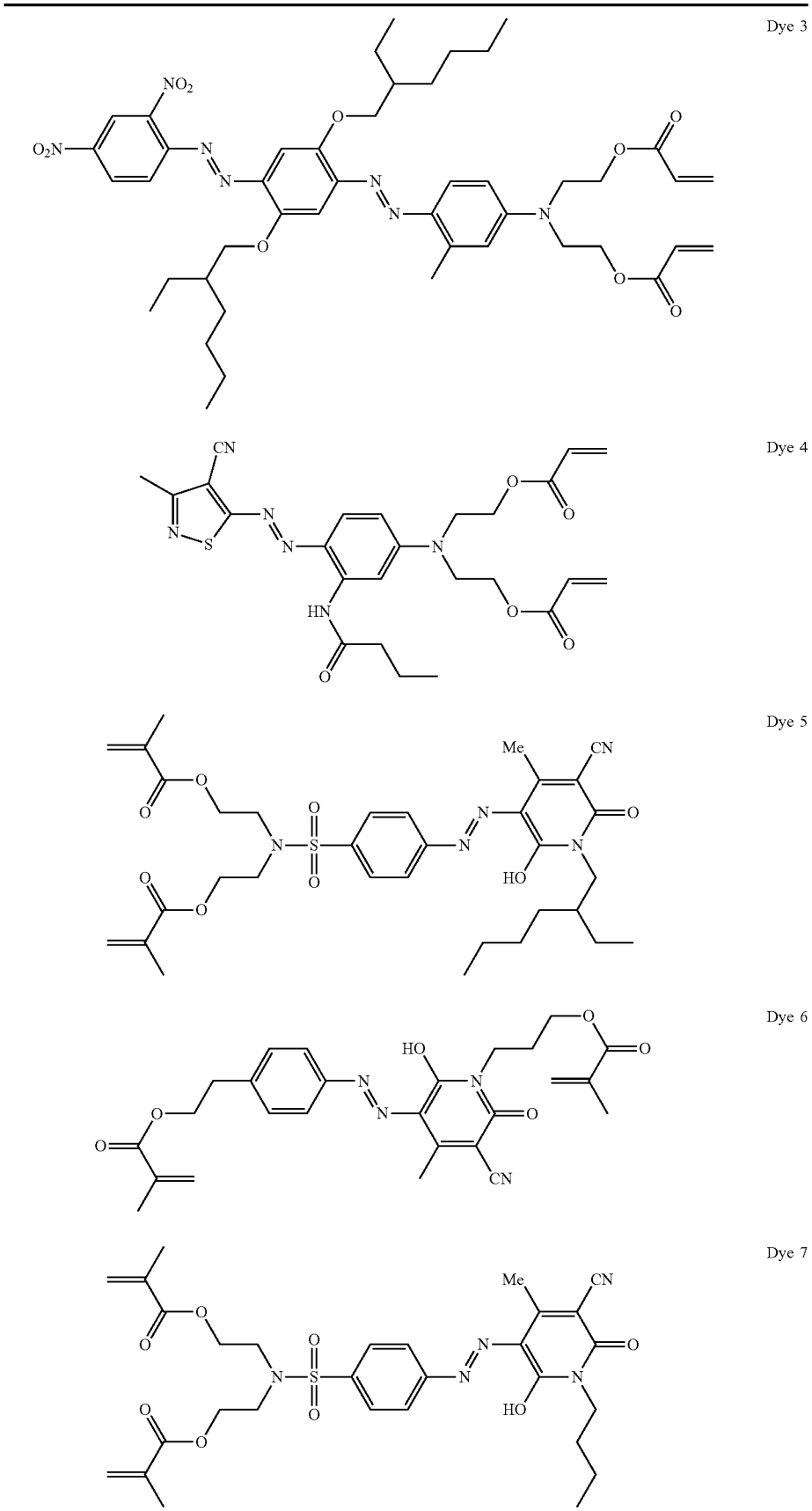

TABLE 3-continued
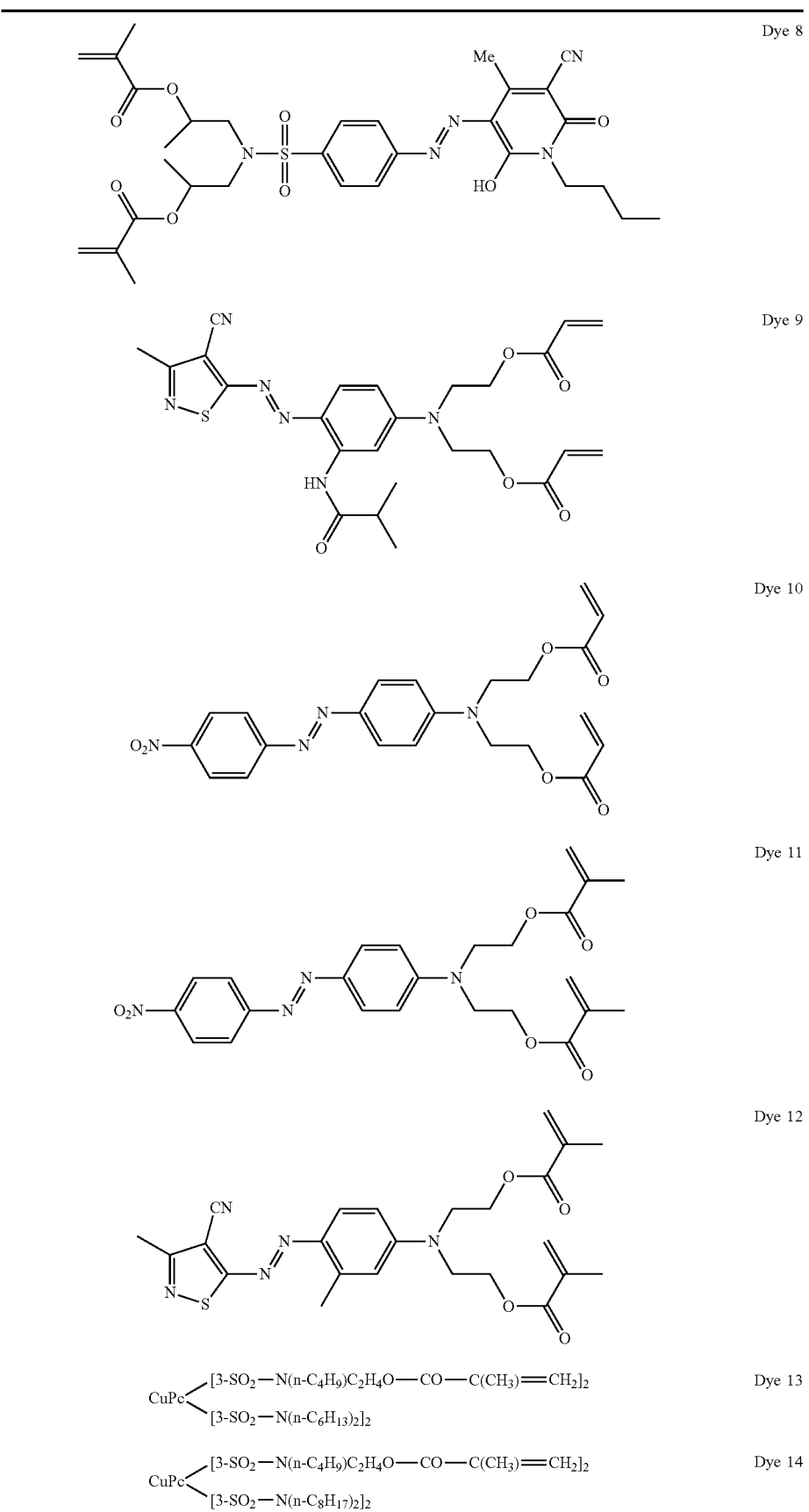

TABLE 3-continued
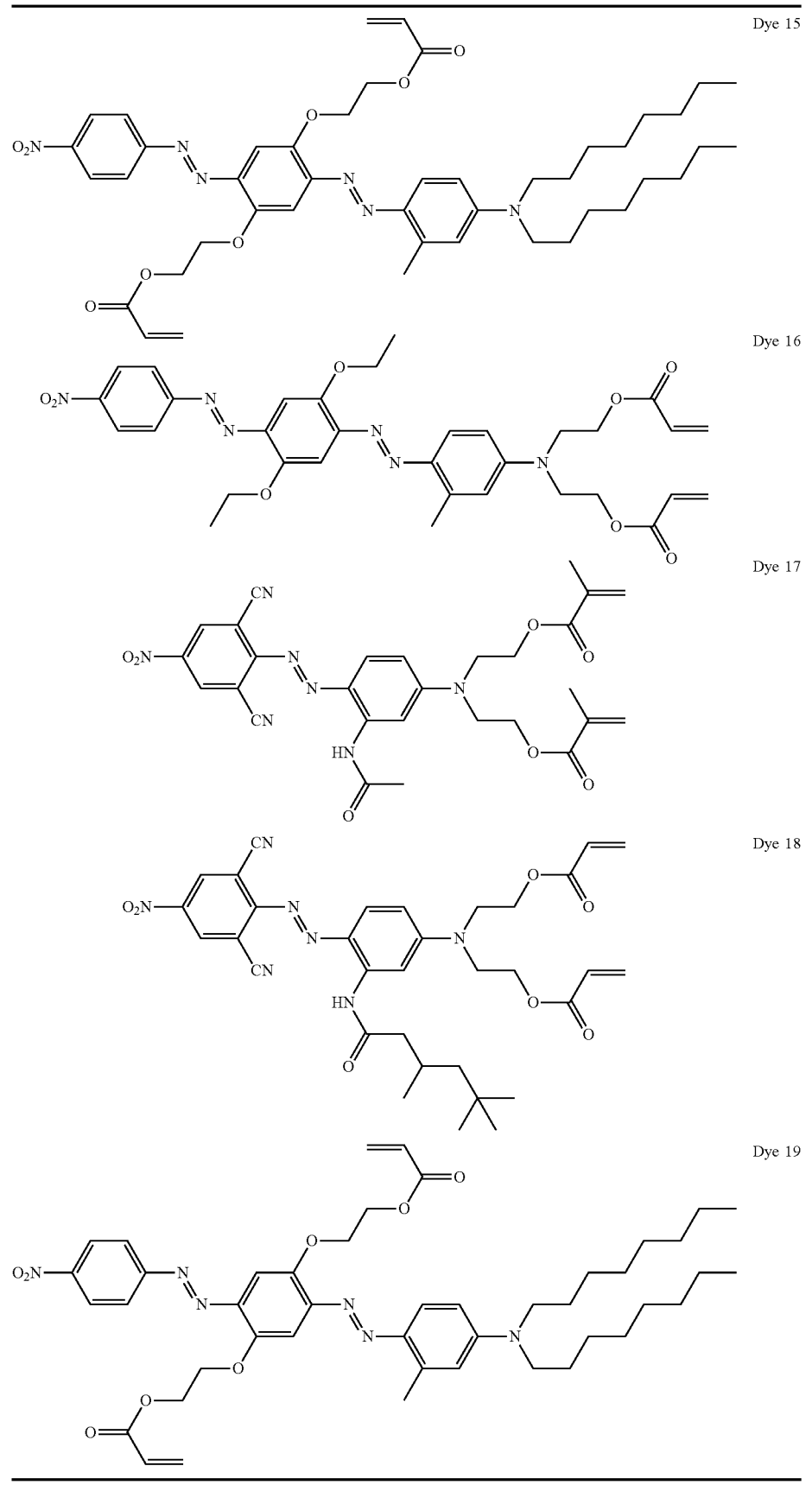

Most preferred are the following dyes: Dye 1, Dye 2, Dye 3 and Dye 4.

Polymerisable dyes, especially the preferred polymerisable dyes can be prepared according to the processes described in WO2010/089057, WO2012/019704, and WO 2013/079146, especially according to WO02012/019704. The disclosures in the cited references are expressly part of the disclosure content of the present patent application.

The preparation of polymerisable dyes of Formula (VII) by a 7 step procedure under convenient conditions as known in the art is exemplified in the following scheme Dye 2:

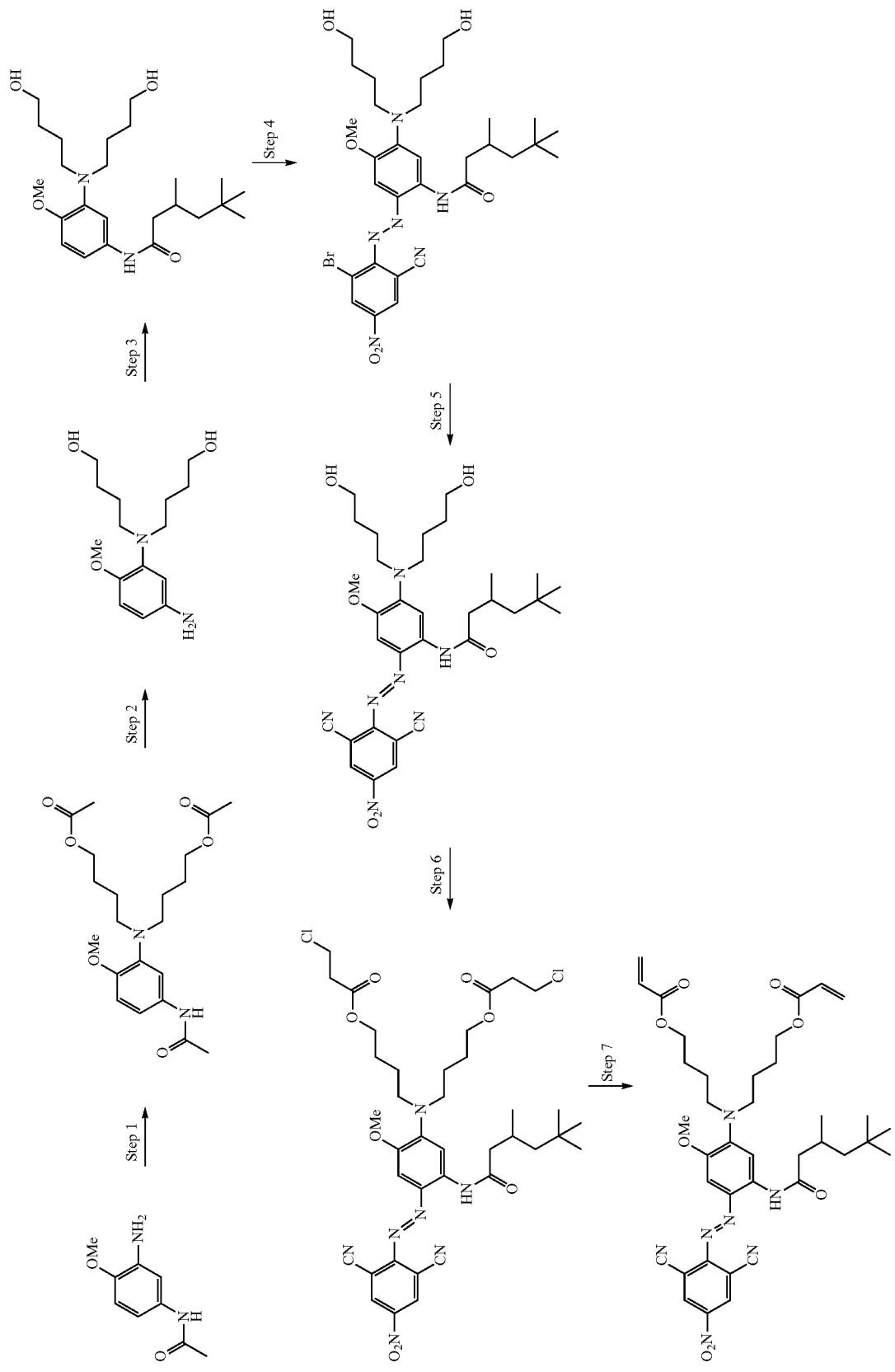

The preparation of polymerisable dyes of Formula (VIII) by a 5 procedure under convenient conditions as known in the art is exemplified in the following scheme for Dye 19:

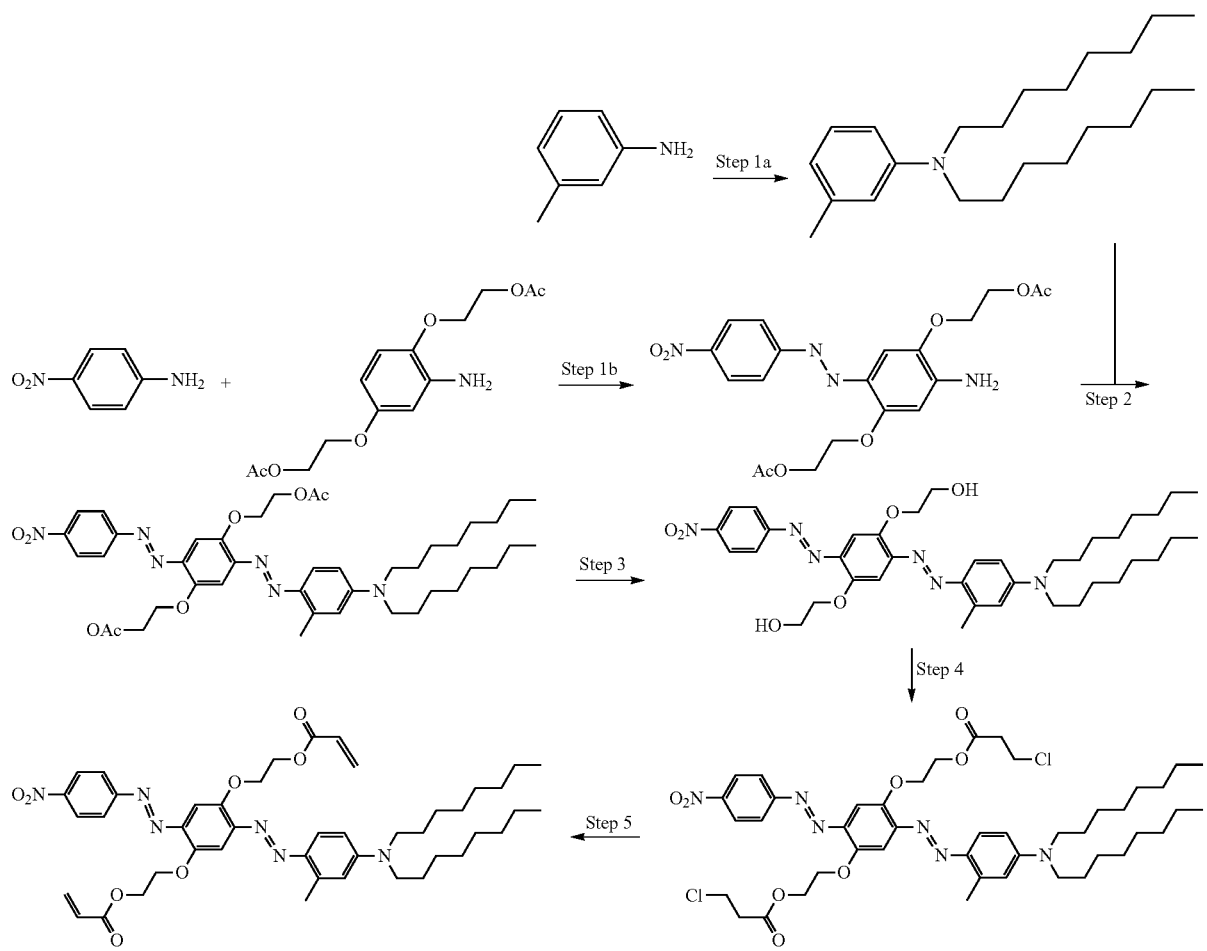

Advantageously, the particles of the invention comprise a combination of the above-mentioned preferred compounds of polymerisable ionic liquid, monomer, pigment, polymerisable steric stabiliser, surfactant, and optionally polymerisable dye.

Most preferred are combinations of polymerisable ionic liquids of Table 1 or Table 2, methyl methacrylate, a preferred surfactant, methacrylate terminated polydimethylsiloxanes with a molecular weight of 10,000 or more, and optionally polymerisable dyes of Table 3.

Most preferred are combinations with titanium dioxide, surfactant (especially A-OT, Span 80 or Span 85, Solsperse 17000, OLOA 11000), methacrylate terminated polydimethylsiloxanes with a molecular weight of 10,000 or more, and methyl methacrylate.

A further subject of the invention is a process for the preparation of particles comprising pigment core encapsulated by a polymer, wherein the polymer preferably comprises monomer units of at least one polymerisable ionic liquid, at least one polymerisable steric stabiliser, at least one monomer, optionally at least one surfactant, and optionally at least one polymerisable dye.

In particular, the invention relates to a process for the preparation of particles comprising a single organic or inorganic pigment core particle coated with at least one surfactant and encapsulated by a polymer, wherein the polymer preferably comprises monomer units of at least one polymerisable ionic liquid, at least one polymerisable steric stabiliser, at least one monomer, and optionally at least one polymerisable dye.

The present process comprises the following steps:
a) dispersing at least one organic or inorganic pigment particle in a solution comprising at least one non-polar organic solvent, optionally at least one surfactant, and optionally at least one polymerisable steric stabiliser;
b) adding at least one monomer, at least one polymerisable ionic liquid of Formula (I) or at least one polymerisable ionic liquid of Formula (II), at least one initiator, and optionally at least one polymerisable dye;
c) subjecting the dispersion of step b) to polymerisation;
d) optionally washing by repeated centrifugation and redispersion in fresh solvent or filtration, and
e) optionally isolating the resulting coated particles In a variant of the invention, the present process comprises the following steps:
a') solubilising at least one surfactant and at least one polymerisable steric stabiliser in a non-polar organic solvent;
b') dispersing at least one organic or inorganic pigment particle in the solution of step a' with optional sonication, milling or high shear mixing);

c') adding at least one monomer, at least one polymerisable ionic liquid of Formula (I) or at least one polymerisable ionic liquid of Formula (II), at least one initiator, and optionally at least one polymerisable dye;

d') subjecting the dispersion of step c') to heating and optionally sonication, milling or high shear mixing or stirring for polymerisation, e') optionally washing by repeated centrifugation and redispersion in fresh solvent or filtration, and f') optionally isolating the resulting coated particles.

Initiators can be for example 2,2'-azobis(isobutyronitrile) (AIBN) (Wako Chemicals), 2,2'-azobis(2-methylbutyronitrile) (Vazo 67) (Wako Chemicals) and benzoyl peroxide.

The preparation process of the particles of the invention is done directly in a non-polar fluid suitable for EPD formulations and in the presence of at least one of the surfactants described above. No expensive drying steps are necessary. The particles can then also be easily formulated for EPD fluids by addition of any required surfactants directly into the dispersion without necessarily changing solvents. Furthermore, a polymerisable steric stabiliser which has reactivity to the forming polymer and is highly soluble in the non-polar fluid is used in the process for the preparation of the particles. This results in a covalently bonded layer on the outer surface of the pigment core particle which effects simple dispersion in non-polar EPD media.

Size and polydispersity of the particles according to the invention can be controlled through control of the polymerisation and the use of ultrasound, milling or high shear mixing. Through correct design of the experiment and quantities of reagents used in synthesis, particles can be created which exhibit low polydispersity and controllable sizes over a wide range. The use of ultrasound, milling or high shear mixing in the reaction can enhance this. Typical process conditions are known to experts in the field.

The particles of the invention are preferably prepared using a dispersion polymerisation. This is a convenient single step method of preparing monodisperse coloured particles. The solvent for the dispersion can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the undyed particles. Tweaking these variables can be useful in order to change the behaviour of the final application. Preferred solvents are often non-polar hydrocarbon solvents such as the Isopar series (Exxon-Mobil), Norpar, Shell-Sol (Shell), Sol-Trol (Shell), naphtha, and other petroleum solvents, decalin, tetralin as well as long chain alkanes such as dodecane, hexadecane, tetradecane, decane and nonane. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The solvent which is particularly suitable is a dodecane.

The selection of the polymerisation conditions depends on the required size and size distribution of the particles. Adjustment of polymerisation conditions is well known to someone skilled in the art.

Preferably the polymerisation according to the invention is a free radical polymerisation.

Typical process conditions are described for the preparation of polymer-pigment hybrid particles incorporating polymerisable ionic liquid.

A cold mixture of initiator, monomers and ionic liquid monomer is added at a controlled rate to a stirred mixture of stabiliser, pigment and surfactant in a non-polar solvent preferably dodecane, which has been optionally sonicated or milled to aid dispersion of the pigment. The reaction is stirred at 300 rpm under an atmosphere of nitrogen, and at a bath temperature of 80° C. The reaction mixture is optionally sonicated throughout the reaction. The reaction is allowed to proceed for approximately 4 hours from the start of addition after which time the reaction is allowed to cool to room temperature. The particles are filtered through a 50 micron cloth and are cleaned by centrifugation and redispersion or stirred filtration in dodecane if required.

The monomer is preferably methyl methacrylate. Optional dye monomer is chosen for its colour, absorbance and solubility in the reaction mixture. The optional dye has preferably at least 2 polymerisable groups to ensure complete chemical bonding and entanglement into the particles and to avoid any subsequent leaching of dye into the solvent. The initiator which is preferably AIBN or Vazo 59 is added to initiate polymerisation and can be added separately to the reaction flask to avoid any unwanted initiation. Ionic liquid monomer is chosen carefully to enable the particle to be charged either positively or negatively with a desired magnitude, and also for its solubility in the reaction. The stabiliser is preferably PDMS-methacrylate and is added to stabiliser the forming polymer particles during the reaction, to control the size of the forming particles and to stabilize the particles in the non-polar medium once the particles are formed.

Mixtures of dyes to obtain desired shade is possible, mixtures of PIL to obtain desired charging is optional, also mixtures of monomers including cross-linking monomers is optional.

The concentration of the final particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the particles are simply separated from the reaction suspension by filtration, preferably by pouring the suspension through a pore size filter, i.e. a 0.1 µm pore size filter, or the particles can be cleaned by centrifuging.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal porphyrins, particularly cobalt porphyrin preferably octane thiol.

The polymerisable composition of the invention preferably comprises 0.1-30%, preferably 0.1-10%, by weight of a polymerisable ionic liquid, 0.1-75%, preferably 8-60%, by weight of at least one organic or inorganic pigment particle, 0.001-20%, preferably 1-10%, by weight of at least one surfactant, 0.1-50%, preferably 5-40, by weight of at least one polymerisable steric stabiliser, 20-95%, preferably 30-90%, by weight of at least one monomer, optionally 1-30%, preferably 1-10%, by weight of a polymerisable dye, optionally 0-3%, by weight of chain transfer agent, and 0.1-10%, preferably 0.1-7.5%, by weight of initiator, all percentages are based on the total weight of the polymerisable composition (except solvent) and always add to 100 percent even if ranges of percentages could lead to higher values.

Advantageously, the polymerisable composition of the invention comprises in a non-polar hydrocarbon solvent, especially dodecane, 0.1-20%, preferably 0.1-10%, by weight of the above-mentioned preferred polymerisable ionic liquid, 1-40% by weight of at least one of the above-mentioned preferred organic or inorganic pigment particles, 0.1-10% by weight of at least one of the above-mentioned preferred surfactants, 1-20% by weight of at least one of the above-mentioned preferred polymerisable steric stabilisers, 5-50% by weight of least one of the above-mentioned preferred polymerisable monomers, 0.1-7.5% by weight of initiator, optionally 1-10% by weight of the above mentioned preferred polymerisable dyes, and optionally 0-3%, by weight of chain transfer agent, wherein most preferably of titanium dioxide in the rutile or anatase modification, sorbitan mono or polyoleates as surfactant, methacrylate terminated polydimethylsiloxanes with a molecular weight of 10,000 or more, and methyl methacrylate are used.

Polymer particles prepared according to the invention are preferably spherical particles with a size (diameter) in the range of 50-1200 nm, preferably 400-1000 nm, especially 400-700 nm, and preferably with a monodisperse size distribution. Smaller or larger particles can be further separated if required by centrifugation or filtration, preferably stirred filtration. Particle sizes are determined by photon correlation spectroscopy of hydrocarbon particle dispersions by a common apparatus such as a Malvern NanoZS particle analyser or preferably by SEM (Scanning Electron Microscopy) and image analysis.

Particles of the invention are primarily designed for use in electrophoretic displays, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99110767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

The particles of the invention, especially the presented white reflective particles may be used in combination with a dyed fluid, with additional particles such as oppositely charged black particles, with oppositely charged coloured particles or with equally charged coloured particles and oppositely charged black particles for example. The particles of the invention, especially the present white reflective particles may be used for example in combination with coloured or black polymer particles.

Preferably these additional black or coloured polymer particles comprise a polymerised or co-polymerised dye. Especially coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles. Especially, the polymer particles described in WO 2009/100803, WO 2010/089057, WO 2010/089058, WO 2010/089059, WO 2010/089060, WO 2011/154103 and/or WO 2012/019704 are suitable for incorporation in the CSD polymers of the invention. Preferably, polymer particles described in WO 2010/089057 and/or WO 2012/019704 may be used.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich). Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (eg. PEO/PEG/PPG), polyols (eg. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (ExxonMobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol OT (Aldrich), Span 85 (Aldrich), and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The coloured and white reflective polymer particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (EW) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection. In the foregoing and in the following examples, unless otherwise indicated all parts and percentages are by weight.

EXAMPLES

PDMS monomers, are purchased from Fluorochem, UK. In the following experiments a terminated monomethacrylate of molecular weight of 10,000 is used. Reagents and dodecane are purchased from Sigma-Aldrich Company and used without further purification. AIBN initiator is purchased from VWR. V59 initiator is purchased from Wako. Non-aqueous dispersion stabiliser (NADS) is purchased from ICI. Polymerisable ionic liquids are prepared before use as described above. PILs with cationic monomers can be prepared by methods described in WO 2012/072218. Titanium dioxide TR92 is obtained from Huntsman, RDI-S is obtained from Sachtleben, Carbon black used is FW200 from Evonik.

Yellow dye (Dye 1) synthesis is previously disclosed in WO 2012/019704/example 24.

Black dye (Dye 3) synthesis is previously disclosed in WO 2013/079146019704/example 3.

Particle size is measured by SEM and image analysis. One drop of a particle dispersion is added to 2.5 ml heptane. One drop of this solution is deposited onto a silica wafer attached to the SEM stub. Samples are sputtered by gold for 120 seconds at 18 mA before being assessed in the SEM chamber.

The electrophoretic fluids are prepared by vortex mixing 3 wt % of particles, 3 wt % of AOT (sodium bis(2-ethylhexyl) sulfosuccinate; 5 wt % in dodecane), and 94 wt % of dodecane. The dispersion is then roller mixed for 30 minutes. This formulation is used for the zeta potential measurement. For the reflective Y values measurements the following formulation is used: 15 wt % of particles, 3 wt % of AOT (sodium bis(2-ethylhexyl) sulfosuccinate; 5 wt % in dodecane), and 82 wt %. For black absorbance measurements the following formulation is used: 1 wt % of particles, 1 wt % of AOT (sodium bis(2-ethylhexyl) sulfosuccinate; 5 wt % in dodecane), and 98 wt %.

The Zeta potentials of the formulations are performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Samples for analysis are prepared from PIL containing particle dispersions with known particle weight content. When using additives, surfactants are added at a concentration so that the ratio of particles to surfactant is 1:1 by weight.

Preparation of PILs
(A) MOTMA Based PILs:
Preparation of MOTMA PF6.

MOTMA Cl (5.0 g, 75% in water) is weighed into a round bottom flask and acetonitrile (10 ml) is added. Separately potassium hexafluorophosphate (3.66 g) added to the acetonitrile solution. The mixture is stirred vigorously overnight at room temperature. The potassium by-product is then removed by filtration, and washed with further acetonitrile. The solvent is concentrated in vacuo. The residue is redissolved in DCM, refiltered and concentrated to yield the ionic liquid product.

(B) Vim Based Ionic Liquids:
Preparation of C12Vim Br

Vinyl imidazole (10.0 g) and bromododecane (29.13 g) are weighed into a round bottomed flask and acetonitrile is added (30 ml) and stirred at 65° C. until consumption of vinyl imidazole is evident by NMR analysis. The reaction mixture is cooled and the mixture concentrated in vacuo. The resulting material is recrystallised using ethyl acetate.

Preparation of C12Vim BuSO3

Amberlite IRA-400 (Cl) resin (100 ml) is loaded into a column and flushed with water until the solvent runs clear. C12Vim Br (10.0 g) is dissolved in acetonitrile (100 ml) and is passed slowly through the resin. The resin is washed with further acetonitrile. The solvent is concentrated in vacuo. The resulting chloride salt is then re-dissolved in acetonitrile (20 ml). In a separate flask the sodium butanesulfonate (5.13 g) is dissolved in acetonitrile. This solution is added drop wise to the stirring chloride salt and is stirred overnight. The resulting suspension is filtered and concentrated in vacuo. The residue is re-dissolved in DCM, re-filtered and concentrated to yield the product ionic liquid.

Preparation of C12Vim NTf

C12Vim Br is charged to a flask (3.0 g). In a separate beaker, lithium bis(trifluoromethane)sulfonimide (2.63 g) is dissolved in water. The aqueous solution is added to the bromide salt and the mixture is stirred overnight. DCM (20 ml) is added and the phases are then separated. The aqueous phase is extracted with further DCM. The combined organics are washed several times with water to remove traces of LiBr and then concentrated in vacuo to yield the ionic liquid.

Preparation of Bromide Salts
(Used for the Preparation of all Imidazolium and Pyrridinium Based Ionic Liquids)

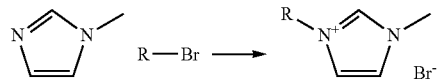

Methyl imidazole (1 eq) and a bromoalkane (1.1 eq) are weighed into a round bottomed flask and acetonitrile is added. The flask is equipped with a magnetic stirrer bar, and a condenser. The mixture is stirred at 65° C. until consumption of methyl imidazole is evident by NMR analysis. The reaction mixture is then cooled and the mixture concentrated in vacuo. The resulting material is recrystallised using ethyl acetate.

Anion Exchange
(Used for the Preparation of all SPMA Ionic Liquids)

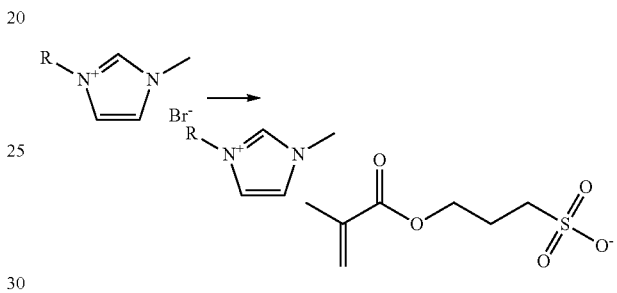

Amberlite IRA-400 (Cl) resin (100 ml) is loaded into a column and flushed with water until the solvent runs clear. A bromide salt (10 g) is dissolved in acetonitrile (100 ml) and is passed slowly through the resin. The resin is washed with further acetonitrile. The solvent is then concentrated in vacuo. The resulting chloride salt is then re-dissolved in acetonitrile (20 ml). In a separate flask the 3-sulfopropylmethyacylate potassium salt (1.1 eq) is dissolved in acetonitrile. This solution is added drop wise to the stirring chloride salt, once addition is complete allowed to stir at room temperature overnight. The resulting suspension is then filtered and concentrated in vacuo. The residue is re-dissolved in DCM, re-filtered and concentrated to yield the product ionic liquid.

Preparation of Dye 2

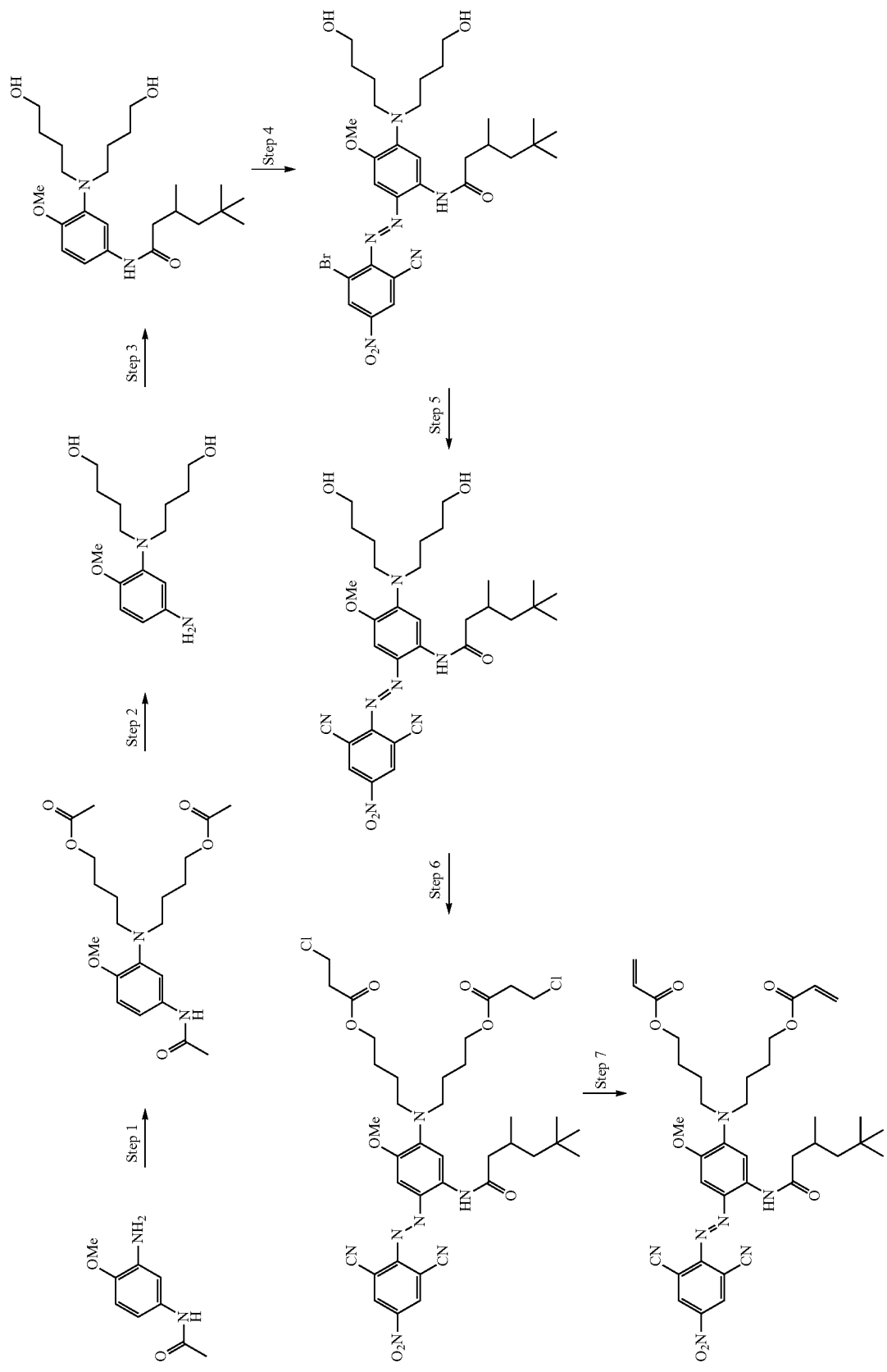

Step 1: 4,4'-(5-acetamido-2-methoxyphenylazanediyl)bis(butane-4,1-diyl)diacetate A stirred mixture of 3'-amino-4'-methoxyacetanilide (18.0 g, 0.1 mol), 4-bromobutyl acetate (48.8 g, 0.25 mol), 1-methyl-2-pyrrolidinone (50 ml) and sodium bicarbonate (55.2 g, 0.66 mol) is heated in an oil bath at 105° C. overnight, allowed to cool and then poured into water (500 ml). After stirring for 30 minutes, the oil that separates is extracted with dichloromethane (150 ml), the organic layer is dried (MgSO$_4$) and evaporated to give a thick brown oil (57.0 g). The oil is used directly without further purification (95% purity).

Step 2: 4,4'-(5-amino-2-methoxyphenylazanediyl)dibutan-1-ol

Crude 4,4'-(5-acetamido-2-methoxyphenylazanediyl)bis(butane-4,1-diyl)diacetate (0.1 mol) is dissolved in dioxane (200 ml) and 1 M LiOH (300 ml) is added. After 15 minutes, the reaction is neutralised with 35% HCl (5 ml) then evaporated to give a brown oil. The oil is dissolved in a mixture of water (200 ml) and 35% HCl (100 ml) and heated for 4 h at 90° C., allowed to cool to RT, basified to pH 11.0 and the resultant oil is extracted with DCM (2×150 ml), dried (MgSO$_4$) and evaporated to give a dark brown viscous oil. (28.3 g, 100%). The crude product is used directly without purification.

Step 3: N-(3-(Bis(4-hydroxybutyl)amino)-4-methoxyphenyl)-3,5,5-trimethylhexanamide 4,4'-(5-Amino-2-methoxyphenylazanediyl)dibutan-1-ol (50 mmol) is dissolved in dichloromethane (200 ml) and to this is added triethylamine (7.6 g, 75 mmol). 3,5,5-Trimethylhexanoyl chloride (8 ml) is added dropwise. Methanol (100 ml) is added and the reaction is stirred overnight and is used directly without further purification.

Step 4: (E)-N-(5-(Bis(4-hydroxybutyl)amino)-2-((2-bromo-6-cyano-4-nitrophenyl)diazenyl)-4-methoxyphenyl)-3,5,5-trimethylhexanamide Sulfuric acid (80% w/w, 75 ml) is cooled to 5° C. and 6-bromo-2-cyano-4-nitroaniline (9.7 g, 40 mmol) is added and stirred for 10 minutes at <5° C. until fully dispersed. Nitrosyl sulfuric acid 40% (w/w) in sulfuric acid (15.3 g, 0.048 mol) is added in portions at 3-5° C. over 30 minutes, then stirred for a further hour at <5° C. N-(3-(Bis(4-hydroxybutyl)amino)-4-methoxyphenyl)-3,5,5-trimethylhexanamide (assume 41 mmol) is diluted with methanol (100 ml), cooled externally in an ice bath to 5° C. and solid ice (50 g) and water (50 ml) are added. Sulfamic acid (10 ml) is added. The above diazonium salt solution is added dropwise over 1 hour. The reaction is stirred overnight, then the solid filtered-off and dried overnight at 40° C. (13.4 g, 50%). The crude product is recrystallised from hot IMS to give the required dye as a green crystalline solid (8.9 g, 32%).

Step 5: (E)-N-(5-(bis(4-hydroxybutyl)amino)-2-((2,6-dicyano-4-nitrophenyl)diazenyl)-4-methoxyphenyl)-3,5,5-trimethylhexanamide N-(5-(Bis(4-hydroxybutyl)amino)-2-((2-bromo-6-cyano-4-nitrophenyl)diazenyl)-4-methoxyphenyl)-3,5,5-trimethylhexanamide (8.8 g, 13.0 mmol) is suspended in 1-methyl-2-pyrrolidinone (15 ml) and warmed to 55° C. to dissolve. Zinc cyanide (0.82 g, 7 mmol) followed by copper(I) cyanide (0.4 mg, 0.45 mmol) are added and the reaction heated to 105° C. (bath temp). After 3 h, external heating is removed and methanol (45 ml) is added. The resultant crystalline solid is filtered off. The solid is recrystallised from IMS (6.1 g, 75%).

Step 6: (E)-4,4'-(4-((2,6-dicyano-4-nitrophenyl)diazenyl)-2-methoxy-5-(3,5,5-trimethyihexanamido)phenylazanediyl)bis(butane-4,1-diyl)bis(3-chloropropanoate)

(E)-N-(5-(Bis(4-hydroxybutyl)amino)-2-((2,6-dicyano-4-nitrophenyl)diazenyl)-4-methoxyphenyl)-3,5,5-trimethylhexanamide (6.0 g, 9.7 mmol) and sodium bicarbonate (8.1 g, 97 mol) are suspended in dichloromethane (120 ml) and 3-chloropropionyl chloride (3.7 g, 29.1 mmol) added. The mixture is heated at 40° C. overnight. Methanol (300 ml) is added and the mixture is concentrated in vacuo to half volume. The precipitated tarry solid is filtered off. The solid is added to dichloromethane (100 ml) and stirred for 5 minutes to dissolve, before inorganics are removed by filtration. The dichloromethane solution is evaporated to give the crude product as a black tarry solid (7.7 g, 90%). The material is purified over silica gel, eluting with 2-5% ethyl acetate in dichloromethane. Combination and evaporation of the pure fractions afford the required compound as a black tarry solid (6.8 g, 80%), which is >99% pure by HPLC.

Step 7: (E)-4,4'-(4-((2,6-dicyano-4-nitrophenyl)diazenyl)-2-methoxy-5-(3,5,5-trimethylhexanamido)phenylazanediyl)bis(butane-4,1-diyl)bis(acrylate)

(E)-4,4'-(4-((2,6-dicyano-4-nitrophenyl)diazenyl)-2-methoxy-5-(3,5,5-trimethylhexanamido)phenyl-azanediyl)bis(butane-4,1-diyl)bis(3-chloropropanoate) (6.8 g, 8.5 mmol) is dissolved in dichloromethane (68 ml) and triethylamine (6.0 ml, 43 mmol) is added. The reaction is warmed for 3 h at 35° C. The solution is washed with 0.2 N HCl, then with water, dried (Na$_2$SO$_4$) and filtered. The solution is evaporated and the resultant tarry solid redissolved in dichloromethane (200 ml), diluted with methanol (400 ml) and stirred overnight allowing solvent to slowly evaporate. The resultant solid is filtered-off, washed with methanol on the filter and dried under high vacuum until a constant weight is obtained. The required dye was obtained as a dark blue solid (5.4 g, 87%). Mp: 120-121° C., $\lambda_{max}$ (EtOAc) 642 nm (98,000), ½ band width=70 nm. $^1$H NMR (CDCl$_3$, 300 MHz) δ 0.92 (9H, s), 1.03 (3H, d, J 6.6), 1.17 (1H, dd, J 14.0, J 6.6), 1.34 (1H, dd, J 14.0, J 3.7), 1.81 (8H, m), 2.16 (1H, m), 2.42 (1H, dd, J 14.0, J 8.0) 2.52 (1H, dd, J 14.0, J 6.5), 3.71 (4H, m), 3.88 (3H, s), 4.23 (4H, t, J 6.0), 5.84 (2H, dd, J 10.5, J 1.5), 6.13 (2H, dd, J 17.3, J 10.5), 6.42 (2H, J 17.3, J 1.5), 7.54 (1H, s), 8.32 (1H, s), 8.63 (2H, s), 9.27 (1H, br. s).

Example 1

Synthesis of White Reflective Particles with Positive Zeta Potential with AOT Surfactant in Dodecane PDMS-MA (2.08 g), dodecane (75 g), Span 85 (1.03 g of 50% solution in dodecane) and titania (10.3 g) are charged to 250 mL three-necked flask. Subaseals are placed into each of the necks, and the flask is placed in a sonic bath at 100% power, 37 Hz for 30 minutes. The flask is removed from the sonic bath and is fitted with an overhead stirrer, condenser and nitrogen bubbler. Nitrogen is bubbled through the dispersion for 30 minutes. The flask is replaced into a sonic bath preheated to 80° C. and at 100% power, 37 Hz. A mixture prepared from AIBN (0.214 g), MMA (10.3 g) and N6666 SPMA (0.103 g) is added to the dispersion at a rate of 3.8 mL per hour. The reaction is continued for 4 hours (from the start of addition). The flask is removed from the sonic bath and allowed to cool to room temperature.

The dispersion is filtered through a 50 micron cloth and washed 3 times in dodecane using centrifugation for 15 minutes at 10 000 rpm, removing the supernatant from the particles and replacing with fresh dodecane. Solid content is calculated to be 51.1 weight %. Average particle size observed by SEM and measured using Image J software is 514 nm. Particles are observed by TEM and show clearly individual pigment particles coated with a layer of polymer.

An electrophoretic ink is prepared by vortex mixing 0.0615 g of particles (51.1% solid content), 0.0617 g of AOT (5.00 wt % solution in dodecane) and 1.9264 g of dodecane. The dispersion is then roller mixed for 30 minutes. Two drops of this dispersion is added to 1.0 ml of dodecane and roller mixed for 30 minutes. The zetapotential of the diluted sample is measured using a Malvern NanoZS particle analyser. zP: +44 mV An electrophoretic ink is prepared by vortex mixing 0.3015 g of particles (51.1% solid content), 0.0603 g of AOT (5.00 wt % solution in dodecane) and 1.6491 g of dodecane. The dispersion is roller mixed for 30 minutes.

The colour coordinates of this dispersion are measured using an X-rite Color i5 spectrophotometer in a 50 micron thickness glass cell and are: L* 76.38, a* −2.12, b* −2.03 and Y is 50.50.

Similarly prepared are the following particles:

TABLE 4

| Example | TiO2 | PIL | % PIL | zp/mV | Y | Size |
|---|---|---|---|---|---|---|
| 1 | TR92 | N6666 SPMA | 1.0 | +44 | 50.5 | 514 |
| 2 | TR92 | P8888 SPMA | 1.0 | +145 | 52.1 | 503 |
| 3 Comparative example | TR92 | NO PIL | 0 | −10.9 | 51.3 | 530 |
| 4 | RDI-S | N6666 SPMA | 0.25 | +109 | 50.33 | 621 |
| 5 | RDI-S | N6666 SPMA | 0.5 | +107 | 50.42 | 467 |
| 6 | RDI-S | N6666 SPMA | 0.75 | +119 | 51.55 | 502 |

TABLE 4-continued

| Example | TiO2 | PIL | % PIL | zp/mV | Y | Size |
|---|---|---|---|---|---|---|
| 7 | RDI-S | N6666 SPMA | 1.0 | +135 | 52.48 | 580 |
| 8 | RDI-S | N6666 SPMA | 5.0 | +207 | 50.9 | 528 |

Example 9

Synthesis of Coloured Reflective Particles with Positive Zeta Potential with AOT Surfactant in Dodecane PDMS-MA (2.08 g), dodecane (75 g), Span 85 (1.03 g of 50% solution in dodecane) and titania TR92 (10.3 g) are charged to 250 mL three-necked flask. Subaseals are placed into each of the necks, and the flask is placed in a sonic bath at 100% power, 37 Hz for 30 minutes. The flask is removed from the sonic bath and is fitted with an overhead stirrer, condenser and nitrogen bubbler. Nitrogen is bubbled through the dispersion for 30 minutes. The flask is replaced into a sonic bath preheated to 80° C. and at 100% power, 37 Hz. A mixture prepared from AIBN (0.21 g), MMA (10.3 g) and N6666 SPMA (0.10 g), Yellow dye 1 (1.03 g) and toluene (6 ml) (is added to the dispersion at a rate of 3.8 mL per hour. The reaction is continued for 4 hours (from the start of addition). The flask is removed from the sonic bath and allowed to cool to room temperature.

The bright yellow dispersion is filtered through a 50 micron cloth and washed 3 times in dodecane using centrifugation for 15 minutes at 10 000 rpm, removing the supernatant from the particles and replacing with fresh dodecane. Solid content is calculated to be 53.0 weight %. Average particle size observed by SEM and measured using Image J software is 553 nm.

An electrophoretic ink is prepared using the same procedure as in example 1. The zetapotential of the diluted sample is measured: zP: +105 mV The colour coordinates of this yellow dispersion are: L* 74.38, a* −9.98, b* 61.82 and Y is 47.30.

Similarly prepared are the following particles:

TABLE 5

| Ex. | Dye | Wt % dye | PIL | Wt % PIL | zp/mV | Y | L* | a* | b* |
|---|---|---|---|---|---|---|---|---|---|
| 9 | 1 | 10 | N6666 SPMA | 1.0 | +105 | 47.30 | 74.38 | −9.98 | 61.82 |
| 10 | 2 | 3 | N6666 SPMA | 1.0 | +165 | 22.92 | 54.99 | −12.31 | −21.54 |
| 11 Comp. ex. | 1 | 5 | NO PIL | 0 | −66 | 52.29 | 77.46 | −14.92 | 49.08 |

Example 12

Preparation of Carbon Black Polymer Hybrid Particles with Polymerisable Ionic Liquid PDMS-MA (2.08 g), dodecane (75 g), Span 85 (0.2 ml of 50% solution in dodecane) and carbon black (1.00 g) are charged to 250 mL three-necked flask. Subaseals are placed into each of the necks, and the flask is placed in a sonic bath at 100% power, 37 Hz for 30 minutes. The flask is removed from the sonic bath and is fitted with an overhead stirrer, condenser and nitrogen bubbler. Nitrogen is bubbled through the dispersion for 30 minutes. The flask is replaced into a sonic bath preheated to 80° C. and at 100% power, 37 Hz. A mixture prepared from AIBN (0.214 g), MMA (5.15 g) and N6666 SPMA (0.05 g) is added to the dispersion at a rate of 3.8 mL per hour. The reaction is continued for 4 hours (from the start of addition). The flask is removed from the sonic bath and allowed to cool to room temperature.

The dispersion is filtered through a 50 micron cloth and washed 3 times in dodecane using centrifugation for 15 minutes at 10 000 rpm, removing the supernatant from the particles and replacing with fresh dodecane. Solid content is calculated to be 51.1 weight %. Average particle size observed by SEM and measured using Image J software is 514 nm.

An electrophoretic ink is prepared in the same way as example 1.

The colour coordinates of this dispersion are: L* 53.72 and Y is 21.72.

Example 13

Preparation of Black Polymer Particles (No Pigment)

Methyl methacrylate (61.74 g), NAD stabiliser (10.50 g), methacrylic acid (1.25 ml), Yellow Dye 1 (0.93 g) and Black Dye 3 (5.25 g), 1-octanethiol (0.38 ml) and dodecane (75.6 g) are charged to a 250 ml 3-necked flask equipped with an overhead stirrer set at 300 rpm, under a nitrogen atmosphere. The reaction is heated to 77° C., at which temperature V-59 is added. The reaction is stirred for 2 hours at this temperature, and is then allowed to cool to room temperature. The reaction is filtered through a 50 micron cloth. The dispersion is cleaned by centrifugation (3×10000 rpm) and replacing the supernatant with clean dodecane. Solid content is calculated to be 50.9 weight %. Average particle size observed by SEM and measured using Image J software is 862 nm with a polydispersity below 5%.

Example 14

Dual Particle Black and White EP Fluid

An electrophoretic ink is prepared by vortex mixing 0.0539 g of Black dyed PMMA particles Example 13 (50.9% solids content), 0.1614 g of White particles from example 1 (51.1% solids content), 0.0165 g of span 85, and 0.0138 g of AOT (40.00 wt % solution in dodecane) and 0.3048 g of dodecane. The dispersion is roller mixed for 30 minutes.

The resulting dispersion is characterised using an Autronics DMS-301 with hemisphere attachment, to give the following data:

TABLE 6

| Formulation | White State Reflectivity (+20 V) | Black State reflectivity (−20 V) | Contrast Ratio (20 V) | Ton (20 V) (response time rise) | Toff (20 V) (response time fall) |
|---|---|---|---|---|---|
| Example 14 | 20.47% | 2.37% | 8.64:1 | 952 ms | 537 ms |

The invention claimed is:

1. Particles comprising an organic or inorganic pigment core particle encapsulated by a polymer having monomer units of
   a) at least one monomer,
   b) at least one polymerisable ionic liquid of Formula (I) or at least one polymerisable ionic liquid of Formula (II)

 Formula (I)

 Formula (II)

wherein $X_1$ and $X_2$ are a polymerisable group, $R_1$ and $R_2$ are a spacer group, $A_1^-$ is an anion selected from borate, imide, phosphate, sulfonate, sulfate, succinate, naphthenate, or carboxylate, and $C_1^+$ a cation selected from phosponium, sulfonuim, oxonium, ammonium, uranium, thioronium, guanidinium or heterocyclic cations, wherein if $C_1^+$ is an ammonium cation $[NR_4]^+$, R is a straight-chain or branched alkyl having 4-20 C atoms, and wherein $A_2^-$ and $C_2^+$ are as follows:

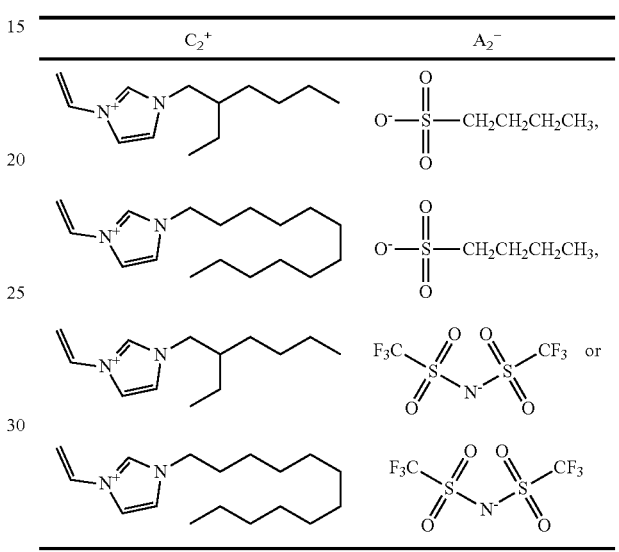

c) optionally at least one polymerisable dye, and
d) optionally at least one polymerisable steric stabiliser
and the particles comprise at least one surfactant, wherein if $C_1^+$ is a heterocyclic cation it is of the following formula:

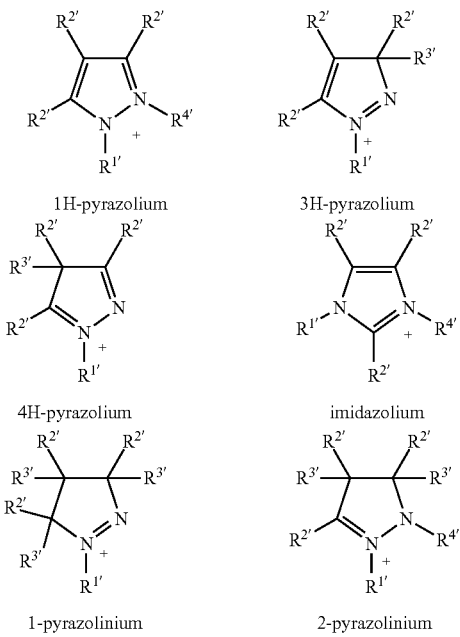

-continued

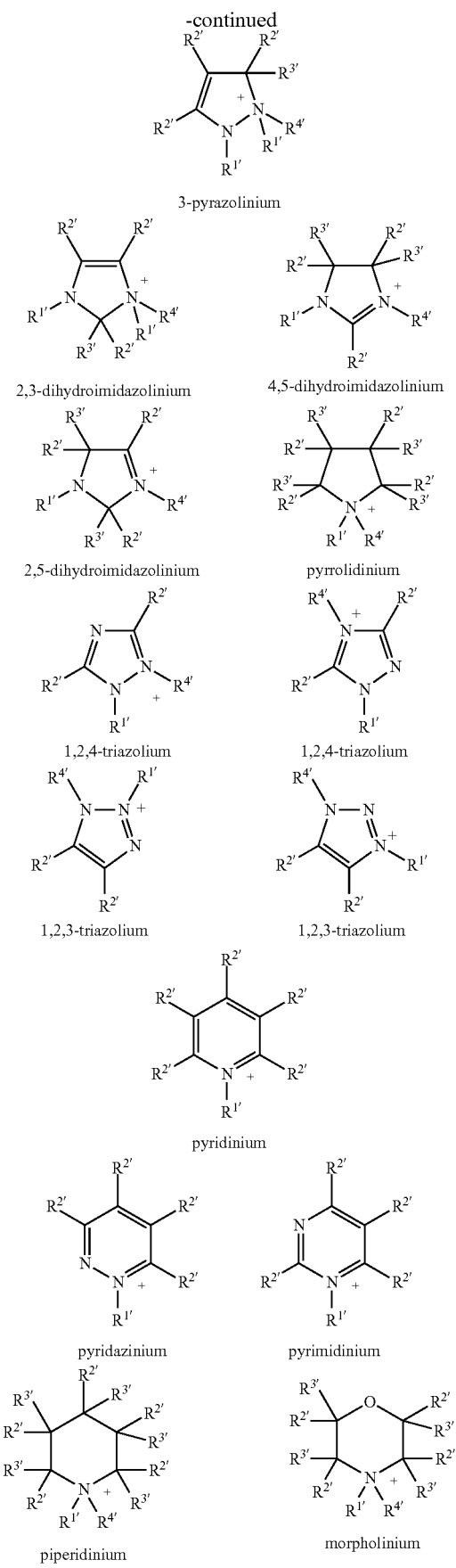

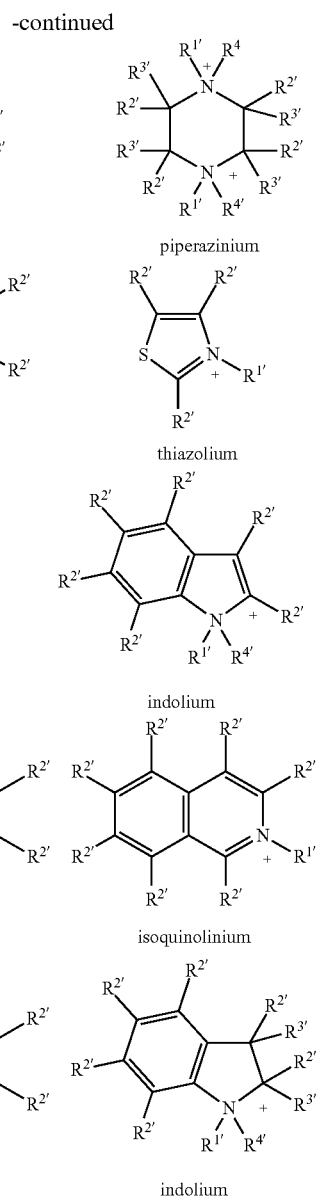

wherein $R^{1'}$ to $R^{4'}$ each, independently of one another, denote a straight-chain or branched alkyl having 1- 20 C atoms, which optionally can be partially fluorinated, but not in α-position to hetero-atom, and which can also include oxygen or/and sulfur atoms in any positions in between carbon atoms;

saturated, partially or fully unsaturated cycloalkyl having 5- 7 C atoms, which may be substituted by alkyl groups having 1-6 C atoms, where the substituents $R^{1'}$, $R^{2'}$, $R^{3'}$ and /or $R^{4'}$ together may also form a ring system.

2. The particles according to claim 1, wherein $X_1$ and $X_2$ are a methacrylate, acrylate, methacrylamide, acrylonitrile, α-substituted acrylate, styrene, vinyl or substituted vinyl group.

3. The particles according to claim 1, wherein $R_1$ and $R_2$ are an alkylene, polyether or poly-dimethylsiloxane group.

4. The particles according to claim 1, wherein the monomer is selected from the group consisting of
methacrylate,
acrylate and
a mixture of methancrylate and acrylate.

5. The particles according to claim 1, wherein the at least on surfactant is soluble in non-polar organ solvents.

6. The particles according to claim 1, wherein a single organic or inorganic pigment core particle is coated with at least one surfactant and encapsulated by a polymer.

7. The particles according to claim 1, wherein the pigment core particle is titanium dioxide in the rutile, anatase, or amorphous modification or carbon black.

8. The particles according to claim 1, wherein the polymerisable steric stabiliser is a poly(dimethylsiloxane) macromonomer with at least one polymerisable group and a molecular weight in the range of 1000-50000.

9. A process for the preparation of the particles according to claim 1 comprising
a) dispersing at least one organic or inorganic pigment particle in a solution comprising at least one non-polar organic solvent, optionally at least one surfactant, and optionally at least one polymerisable steric stabiliser;
b) adding at least one monomer, at least one polymerisable ionic liquid of Formula (I) or at least one polymerisable ionic liquid of Formula (II), at least one initiator, and optionally at least one polymerisable dye;
c) subjecting the dispersion of step b) to polymerisation;
d) optionally washing by repeated centrifugation and redispersion in fresh solvent or filtration, and
e) optionally isolating the resulting coated particles.

10. The process according to claim 9, wherein the process comprises the following steps:
a') solubilising at least one surfactant and at least one polymerisable steric stabiliser in a non-polar organic solvent;
b') dispersing at least one organic or inorganic pigment particle in the solution of step a') with optional sonication, milling or high shear mixing;
c') adding at least one monomer, at least one polymerisable ionic liquid of Formula (I) or at least one polymerisable ionic liquid of Formula (II), at least one initiator, and optionally at least one polymerisable dye;
d') subjecting the dispersion of step c') to heating and optionally sonication, milling or high shear mixing or stirring for polymerisation,
e') optionally washing by repeated centrifugation and redispersion in fresh solvent or filtration, and
f') optionally isolating the resulting coated particles.

11. An electrophoretic fluid comprising particles prepared by the process according to claim 9.

12. An optical, electrooptical, electronic, electrochemical, electrophotographic, electrowetting or electrophoretic displays and in security, cosmetic, decorative, and diagnostic applications, which comprises the particles according to claim 1.

13. A mono, bi or polychromal electrophoretic devices which comprises particles according to claim 1.

14. An electrophoretic fluid comprising particles according to claim 1.

15. An electrophoretic display device comprising the electrophoretic fluid according to claim 14.

16. The electrophoretic display device according to claim 15, wherein the electrophoretic fluid is applied by a technique selected from inkjet printing, slot die spraying, nozzle spraying, and flexographic printing, or deposition technique.

17. The electrophoretic display device according to claim 15, wherein the electrophoretic fluid is applied by a contact or contactless printing.

18. The particles according to claim 1, wherein the heterocyclic cations are selected from the group consisting of imidazolium, pyridinium, pyrrolidinium, trizalolium, morpholinium and piperidinium cation.

19. The particles according to claim 1, wherein the cation $C_1^+$ is tetrahexylammonium, tetradodecylammonium, tetrabutylphosphonium, tetracytophosphonium, trihexyltetradecylphosphonium, methyloctylimidazolium or dodecymethylpyrrolidinium.

20. The particles according to claim 1, wherein the anion $A_1^-$ is 3-sulfopropylmethacrylate or 3-sulfopropylacrylate.

21. The particles according claim 1, wherein the at least one polymerisable ionic liquid of Formula (I) is present.

22. The particles according to claim 1, wherein said cation and anion are as follows:

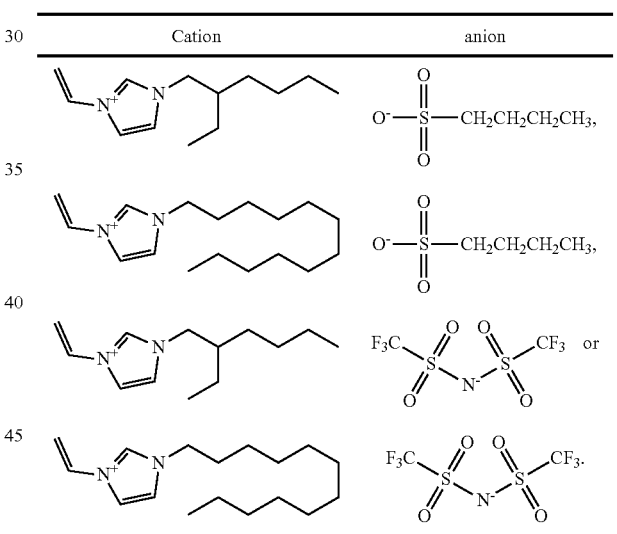

23. The particles to claim 1, wherein the cation $C_1^+$ is selected from the group consisting a tetraalkylammonium, tetraalkylphosphonium, N-alkylpyridinium, N,N-dialkypyrrolidinium, 1,3-dialkylimidazolium, and trialkulsufonium cation, wherein if $C_1^1$ is an ammonium cation $[NR_4]^+$ R is a straight-chain or branched alkyl having 4-20 C atoms.

* * * * *